US010073444B2

(12) United States Patent
Wu et al.

(10) Patent No.: US 10,073,444 B2
(45) Date of Patent: Sep. 11, 2018

(54) PETRI NET-BASED OPTIMAL ONE-WAFER CYCLIC SCHEDULING OF TREELIKE HYBRID MULTI-CLUSTER TOOLS

(71) Applicant: Macau University of Science and Technology, Macau (MO)

(72) Inventors: Naiqi Wu, Macau (MO); Fajun Yang, Macau (MO); Yan Qiao, Macau (MO); Mengchu Zhou, Macau (MO)

(73) Assignee: Macau University of Science and Technology, Macau (MO)

( * ) Notice: Subject to any disclaimer, the term of this patent is extended or adjusted under 35 U.S.C. 154(b) by 322 days.

(21) Appl. No.: 14/919,720

(22) Filed: Oct. 21, 2015

(65) Prior Publication Data

US 2017/0083009 A1 Mar. 23, 2017

Related U.S. Application Data

(60) Provisional application No. 62/221,038, filed on Sep. 20, 2015.

(51) Int. Cl.
*G05B 19/41* (2006.01)
*G05B 19/418* (2006.01)

(52) U.S. Cl.
CPC ............ *G05B 19/4187* (2013.01); *G05B 2219/31429* (2013.01); *G05B 2219/45032* (2013.01);
(Continued)

(58) Field of Classification Search
CPC ...... G05B 19/4187; G05B 2219/45031; G05B 2219/50291; Y02P 90/02
See application file for complete search history.

(56) References Cited

U.S. PATENT DOCUMENTS 5,135,608 A * 8/1992 Okutani ............ H01L 21/67167
118/50.1
5,402,350 A * 3/1995 Kline ............... G05B 19/41865
257/E21.525

(Continued)

OTHER PUBLICATIONS

Aized, T., "Petri Net as a Manufacturing System Scheduling Tool, Advances in Petri Net Theory and Applications", 2010, ISBN: 978-953-307-108-4.*

(Continued)

*Primary Examiner* — Mohammad Ali
*Assistant Examiner* — Kelvin Booker
(74) *Attorney, Agent, or Firm* — Spruson & Ferguson (Hong Kong) Limited

(57) ABSTRACT

Since single and dual-arm tools behave differently, it is difficult to coordinate their activities in a hybrid multi-cluster tool that is composed of both single- and dual-arm tools. Aiming at finding an optimal one-wafer cyclic schedule for a treelike hybrid multi-cluster tool whose bottleneck tool is process-bound, the present work extends a resource-oriented Petri net to model such system. By the developed Petri net model, to find a one-wafer cyclic schedule is to determine robot waiting times. By doing so, it is shown that, for any treelike hybrid multi-cluster tool whose bottleneck tool is process-bound, there is always a one-wafer cyclic schedule. Then, computationally efficient algorithms are developed to obtain the minimal cycle time and the optimal one-wafer cyclic schedule. Examples are given to illustrate the developed method.

7 Claims, 7 Drawing Sheets

(52) U.S. Cl.
CPC ............ *Y02P 90/205* (2015.11); *Y10S 901/02* (2013.01); *Y10S 901/41* (2013.01)

(56) References Cited

U.S. PATENT DOCUMENTS

| | | | | |
|---|---|---|---|---|
| 5,928,389 | A * | 7/1999 | Jevtic | G05B 19/41865 29/25.01 |
| 6,201,999 | B1 * | 3/2001 | Jevtic | G03F 7/70533 118/719 |
| 6,224,638 | B1 | 5/2001 | Jevtic | |
| 6,418,350 | B1 * | 7/2002 | Hamidzadeh | G05B 19/41865 700/100 |
| 6,470,231 | B1 * | 10/2002 | Yang | G06Q 10/04 700/100 |
| 6,496,746 | B2 * | 12/2002 | Jevtic | G03F 7/70533 118/719 |
| 6,526,329 | B2 * | 2/2003 | Tateyama | G03F 7/7075 414/806 |
| 6,725,114 | B1 * | 4/2004 | Jevtic | G03F 7/70533 700/100 |
| 6,736,929 | B2 * | 5/2004 | Komandur | G05B 19/41865 118/719 |
| 7,694,647 | B2 * | 4/2010 | Ishikawa | G03B 27/32 118/50 |
| 7,699,021 | B2 * | 4/2010 | Volfovski | G03B 27/32 118/50 |
| 8,538,573 | B2 * | 9/2013 | Nakata | G06F 19/00 700/121 |
| 8,781,614 | B2 * | 7/2014 | Wu | G05B 19/41865 700/102 |
| 8,911,193 | B2 * | 12/2014 | Rice | G03F 7/70991 414/222.13 |
| 9,037,279 | B2 * | 5/2015 | Ko | G05B 17/02 438/5 |
| 9,223,307 | B1 * | 12/2015 | Wu | B25J 9/009 |
| 9,227,318 | B1 * | 1/2016 | Bai | B25J 9/009 |
| 9,310,320 | B2 * | 4/2016 | Kurada | G01N 21/95607 |
| 9,333,645 | B1 * | 5/2016 | Wu | B25J 9/0087 |
| 2001/0011198 | A1 * | 8/2001 | Jevtic | G03F 7/70533 700/100 |
| 2005/0065630 | A1 * | 3/2005 | Funk | G05B 19/042 700/121 |
| 2005/0102723 | A1 * | 5/2005 | Van Den Nieuwelaar | G03F 7/70525 718/1 |
| 2007/0090953 | A1 * | 4/2007 | Park | G05B 19/4183 340/572.1 |
| 2007/0282480 | A1 * | 12/2007 | Pannese | G05B 15/02 700/213 |
| 2008/0163096 | A1 * | 7/2008 | Pannese | G05B 19/4069 715/772 |
| 2011/0060441 | A1 * | 3/2011 | Ko | G05B 17/02 700/101 |
| 2015/0241876 | A1 * | 8/2015 | Ko | G05B 17/02 700/101 |
| 2017/0080563 | A1 * | 3/2017 | Wu | G05B 19/41865 |
| 2017/0115651 | A1 * | 4/2017 | Wu | G05B 19/0426 |

OTHER PUBLICATIONS

Jung, C.; Kim, H.-J. and Lee, T.-E., "A Branch and Bound Algorithm for Cyclic Scheduling of Timed Petri Nets", Jan. 2015, IEEE Transactions on Automation Science and Engineering, vol. 12, No. 1.*

Kim, H.-J.; Lee, J.-H. and Lee, T.-E., "Noncyclic Scheduling of Cluster Tools with a Branch and Bound Algorithm", Apr. 2015, IEEE Transactions on Automation Science and Engineering, vol. 12, No. 2.*

Kim, W.-S. and Morrison, J.R., "On Equilibrium Probabilities for the Delays in Deterministic Flow Lines with Random Arrivals", Jan. 2015, IEEE Transactions on Automation Science and Engineering, vol. 12, No. 1.*

Lee, Y.-H.; Chang, C.-T.; Wong, D.S.-H. and Jang, S.-S., "Petri-Net Based Scheduling Strategy for Semiconductor Manufacturing Processes", 2011, Chemical Engineering Research and Design, 89, 291-300.*

Li, L.; Sun, Z.; Zhou, M.C. and Qiao, F., "Adaptive Dispatching Rule for Semiconductor Wafer Fabrication Facility", Apr. 2013, IEEE Transactions on Automation Science and Engineering, vol. 10, No. 2.*

Lin, S.-Y.; Fu, L.-C.; Chiang, T.-C. and Shen, Y.-S., "Colored Timed Petri-Net and GA Based Approach to Modeling and Scheduling for Wafer Probe Center", Sep. 2003, Proceedings of the 2003 IEEE Intl. Conf. on Robotics and Automation.*

Qiao, Y.; Wu, N.Q. and Zhou, M.C., "A Petri Net-Based Novel Scheduling Approach and Its Cycle Time Analysis for Dual-Arm Cluster Tools with Wafer Revisiting", Feb. 2013, IEEE Transactions on Semiconductor Manufacturing, vol. 26, No. 1.*

Qiao, Y.; Wu, N. and Zhou, M., "Petri Net Modeling and Wafer Sojourn Time Analysis of Single-Arm Cluster Tools with Residency Time Constraint and Activity Time Variation", 2011.*

Qiao, Y.; Wu, N. and Zhou, M., "Real-Time Scheduling of Single-Arm Cluster Tools Subject to Residency Time Constraints and Bounded Activity Time Variation", Jul. 2012, IEEE Transactions on Automation Science and Engineering, vol. 9, No. 3.*

Qiao, Y.; Wu, N. and Zhou, M., "Scheduling of Dual-Arm Cluster Tools with Wafer Revisiting and Residency Time Contraints", Feb. 2014, IEEE Transactions on Industrial Informatics, vol. 10, No. 1.*

Qiao, Y.; Pan, C.-R.; Wu, N.-Q. and Zhou, M., "Response Policies to Process Module Failure in Single-Arm Cluster Tools Subject to Wafer Residency Time Constraints", Jul. 2015, IEEE Transactions on Automation Schence and Engineering, vol. 12, No. 3.*

Yang, F.; Qu, N.; Qiao, Y. and Zhou, M., "Optimal One-Wafer Cyclic Scheduling Analysis of Hybrid Multi-Cluster Tools with ONe-Space Buffering Module", May 31-Jun. 7, 2014, 2014 IEEE Intl Conf. on Robotics and Automation.*

Yang, F.; Wu, N.; Qiao, Y. and Zhou, M., "Petri Net-Based Optimal One-Wafer Cyclic Scheduling of Hybrid Multi-Cluster Tools in Wafer Fabrication", May 2014, IEEE Transactions on Semiconductor Manufacturing, vol. 27, No. 2.*

Yang, F.; Wu, N.; Qiao, Y. and Zhou, M., "Petri Net-Based Polynomially Complex Approach to Optimal One-Wafer Cyclic Scheduling of Hybrid Multi-Cluster Tools in Semiconductor Manufacturing", Dec. 2014, IEEE Transactions on Systems, Man and Cybernetics, vol. 44, No. 12.*

Zhu, Q.; Wu, N.; Qiao, Y. and Zhou, M., "Petri Net Modeling and One-Wafer Scheduling of Single-Arm Multi-Cluster Tools", 2013, 2013 IEEE Intl Conf on Automation Science.*

Zhu, Q. and Qiao, Y., "Scheduling Single-Arm Multi-Cluster Tools with Lower Bound Cycle Time via Petri Nets", Dec. 2012, Intl Journal of Intelligent Control and Systems, vol. 17, No. 4.*

Zhu, Q.; Qiao, Y. and Zhou, M., "Petri Net Modeling and One-Wafer Scheduling of Single-Arm Tree-Like Multi-Cluster Tools", Aug. 2015, 2015 IEEE Intl Conf on Automation Science and Engineering.*

Zhu, Q.; Wu, N.; Qiao, Y. and Zhou, M., "Modeling and Schedulability Analysis of Single-Arm Multi-Cluster Tools with Residency Time Contraints via Petri Nets", Aug. 2014, 2014 IEEE Intl Conf on Automation Science and Engineering.*

W. K. Chan, J. G. Yi, and S. W. Ding, "On the optimality of one-unit cycle scheduling of multi-cluster tools with single-blade robots," Proceedings of 2007 IEEE International Conference on Automation Science and Engineering, pp. 392-397, Scottsdale, USA, 2007.

W. K. Chan, J. G. Yi, and S. W. Ding, "Optimal Scheduling of Multi-cluster Tools with Constant Robot Moving Times, Part I: Two-Cluster Analysis," IEEE Transactions on Automation Science and Engineering, vol. 8, No. 1, pp. 5-16, 2011.

W. K. Chan, J. G. Yi, S. W. Ding, and D. Z. Song, "Optimal Scheduling of Multi-cluster Tools with Constant Robot Moving Times, Part II: Tree-Like Topology Configurations," IEEE Transactions on Automation Science and Engineering, vol. 8, No. 1, pp. 17-28, 2011.

(56) References Cited

OTHER PUBLICATIONS

S. W. Ding, J. G. Yi, and M. T. Zhang, "Multicluster Tools Scheduling: an Integrated Event Graph and Network Model Approach," IEEE Transactions on Semiconductor Manufacturing, vol. 19, No. 3, pp. 339-351, 2006.

J.-H. Kim, T.-E. Lee, H.-Y. Lee, and D.-B. Park, "Scheduling analysis of timed-constrained dual-armed cluster tools," IEEE Transactions on Semiconductor Manufacturing, vol. 16, No. 3, 521-534, 2003.

T.-E. Lee, H.-Y. Lee, and Y.-H. Shin, "Workload balancing and scheduling of a single-armed cluster tool," Proceedings of the 5th APIEMS Conference, Gold Coast, Australia, pp. 1-15, 2004.

M.-J. Lopez and S.-C. Wood, "Systems of multiple cluster tools—configuration, reliability, and performance," IEEE Transactions on Semiconductor Manufacturing, vol. 16, No. 2, pp. 170-178, 2003.

T. L. Perkinson, R. S. Gyurcsik, and P. K. MacLarty, "Single-wafer cluster tool performance: An analysis of the effects of redundant chambers and revisitations sequences on throughput," IEEE Transactions on Semiconductor Manufacturing, vol. 9, No. 3, pp. 384-400, 1996.

T. L. Perkinson, P. K. MacLarty, R. S. Gyurcsik, and R. K. Cavin, III, "Single-wafer cluster tool performance: An analysis of throughput," IEEE Transactions on Semiconductor Manufacturing, vol. 7, No. 3, pp. 369-373, 1994.

S. Sechi, C. Sriskandarajah, G. Sorger, J. Blazewicz, and W. Kubiak, "Sequencing of parts and robot moves in a robotic cell," International Journal of Flexible Manufacturing Systems, vol. 4, No. 3-4, pp. 331-358, 1992.

S. Venkatesh, R. Davenport, P. Foxhoven, and J. Nulman, "A steady state throughput analysis of cluster tools: Dual-blade versus single-blade robots," IEEE Transactions on Semiconductor Manufacturing, vol. 10, No. 4, pp. 418-424, 1997.

N. Q. Wu, "Necessary and Sufficient Conditions for Deadlock-free Operation in Flexible Manufacturing Systems Using a Colored Petri Net Model," IEEE Transactions on Systems, Man, and Cybernetics, Part C, vol. 29, No. 2, pp. 192-204, 1999.

N. Q. Wu, C. B. Chu, F. Chu, and M. C. Zhou, "A Petri net method for schedulability and scheduling problems in single-arm cluster tools with wafer residency time constraints," IEEE Transactions on Semiconductor Manufacturing, vol. 21, No. 2, pp. 224-237, 2008.

N. Q. Wu, F. Chu, C. Chu, and M. Zhou, "Petri Net-Based Scheduling of Single-Arm Cluster Tools With Reentrant Atomic Layer Deposition Processes," IEEE Transactions on Automation Science and Engineering, vol. 8, No. 1, pp. 42-55, Jan. 2011.

N. Q. Wu, F. Chu, C. B. Chu, and M. C. Zhou, Petri net modeling and cycle time analysis of dual-arm cluster tools with wafer revisiting, IEEE Transactions on Systems, Man, & Cybernetics: Systems, vol. 43, No. 1, pp. 196-207, 2013.

N. Q. Wu, M. C. Zhou, F. Chu, and C. B. Chu, "A Petri-net-based scheduling strategy for dual-arm cluster tools with wafer revisiting," IEEE Transactions on Systems, Man, & Cybernetics: Systems, vol. 43, No. 5, pp. 1182-1194, 2013.

N. Q. Wu and M. C. Zhou, "Avoiding deadlock and reducing starvation and blocking in automated manufacturing systems based on a Petri net model," IEEE Transactions on Robotics and Automation, vol. 17, No. 5, pp. 658-669, 2001.

N. Q. Wu and M. C. Zhou, "Analysis of wafer sojourn time in dual-arm cluster tools with residency time constraint and activity time variation," IEEE Transactions on Semiconductor Manufacturing, vol. 23, No. 1, pp. 53-64, 2010.

N. Q. Wu and M. C. Zhou, "A closed-form solution for schedulability and optimal scheduling of dual-arm cluster tools based on steady schedule analysis," IEEE Transactions on Automation Science and Engineering, vol. 7, No. 2, pp. 303-315, 2010.

N. Q. Wu and M. C. Zhou, "Modeling, analysis and control of dual-arm cluster tools with residency time constraint and activity time variation based on Petri nets," IEEE Transactions on Automation Science and Engineering, vol. 9, No. 2, pp. 446-454, 2012.

N. Q. Wu and M. C. Zhou, "Schedulability analysis and optimal scheduling of dual-arm cluster tools with residency time constraint and activity time variation," IEEE Transactions on Automation Science and Engineering, vol. 9, No. 1, pp. 203-209, 2012.

F. J. Yang, N. Q. Wu, Y. Qiao, and M. C. Zhou, Petri net-based optimal one-wafer cyclic scheduling of hybrid multi-cluster tools in wafer fabrication, IEEE Transactions on Semiconductor Manufacturing, vol. 27, No. 2, pp. 192-203, 2014.

F. J. Yang, N. Q. Wu, Y. Qiao, and M. C. Zhou, "Petri net-based polynomially complex approach to optimal one-wafer cyclic scheduling of hybrid multi-cluster tools in semiconductor manufacturing," IEEE Transactions on System, Man, & Cybernetics: System, vol. 44, No. 12, pp. 1598-1610, 2014.

J. G. Yi, S. W. Ding, D. Z. Song, and M. T. Zhang, "Steady-State Throughput and Scheduling Analysis of Multi-Cluster Tools for Semiconductor Manufacturing: A Decomposition Approach," IEEE Transactions on Automation Science and Engineering, vol. 5, No. 2, pp. 321-336, 2008.

Q. H. Zhu, N. Q. Wu, Y. Qiao, and M. C. Zhou, "Petri net-based optimal one-wafer scheduling of single-arm multi-cluster tools in semiconductor manufacturing," IEEE Transactions on Semiconductor Manufacturing, vol. 26, No. 4, 578-591, 2013.

Q. H. Zhu, N. Q. Wu, Y. Qiao, and M. C. Zhou, "Scheduling of single-arm multi-cluster tools with wafer residency time constraints in semiconductor manufacturing," IEEE Transactions on Semiconductor Manufacturing, vo. 28, No. 1, pp. 117-125, 2015.

W. M. Zuberek, "Timed Petri nets in modeling and analysis of cluster tools," IEEE Transactions on Robotics Automation, vol. 17, No. 5, pp. 562-575, Oct. 2001.

\* cited by examiner

PETRI NET-BASED OPTIMAL ONE-WAFER CYCLIC SCHEDULING OF TREELIKE HYBRID MULTI-CLUSTER TOOLS

CROSS-REFERENCE TO RELATED APPLICATIONS

This application claims the benefit of U.S. Provisional Patent Application No. 62/221,038, filed on Sep. 20, 2015, which is incorporated by reference herein in its entirety.

LIST OF ABBREVIATIONS

BM buffer module
FP fundamental period
EST extended sub-tree
LB lower bound
O²CS optimal one-wafer cyclic schedule
OSLB one-wafer cyclic schedule achieving the LB of cycle time
PM process module
PN Petri net
ST sub-tree

BACKGROUND

Field of the Invention

The present invention generally relates to scheduling a treelike hybrid multi-cluster tool. In particular, the present invention relates to a method for generating an optimal one-wafer cyclic schedule with minimal cycle time for this multi-cluster tool when no one-wafer cyclic schedule that achieves a LB of cycle time exists.

LIST OF REFERENCES

There follows a list of references that are occasionally cited in the specification. Each of the disclosures of these references is incorporated by reference herein in its entirety.

W. K. Chan, J. G. Yi, and S. W. Ding, "On the optimality of one-unit cycle scheduling of multi-cluster tools with single-blade robots," *Proceedings of 2007 IEEE International Conference on Automation Science and Engineering*, pp. 392-397, Scottsdale, USA, 2007.

W. K. Chan, J. G. Yi, and S. W. Ding, "Optimal Scheduling of Multi-cluster Tools with Constant Robot Moving Times, Part I: Two-Cluster Analysis," *IEEE Transactions on Automation Science and Engineering*, vol. 8, no. 1, pp. 5-16, 2011a.

W. K. Chan, J. G. Yi, S. W. Ding, and D. Z. Song, "Optimal Scheduling of Multi-cluster Tools with Constant Robot Moving Times, Part II: Tree-Like Topology Configurations," *IEEE Transactions on Automation Science and Engineering*, vol. 8, no. 1, pp. 17-28, 2011b.

S. W. Ding, J. G. Yi, and M. T. Zhang, "Multicluster Tools Scheduling: an Integrated Event Graph and Network Model Approach," *IEEE Transactions on Semiconductor Manufacturing*, vol. 19, no. 3, pp. 339-351, 2006.

J.-H. Kim, T.-E. Lee, H.-Y. Lee, and D.-B. Park, "Scheduling analysis of timed-constrained dual-armed cluster tools," *IEEE Transactions on Semiconductor Manufacturing*, vol. 16, no. 3, 521-534, 2003.

T.-E. Lee, H.-Y. Lee, and Y.-H. Shin, "Workload balancing and scheduling of a single-armed cluster tool," *Proceedings of the 5th APIEMS Conference, Gold Coast, Australia*, pp. 1-15, 2004.

M.-J. Lopez and S.-C. Wood, "Systems of multiple cluster tools configuration, reliability, and performance," *IEEE Transactions on Semiconductor Manufacturing*, vol. 16, no. 2, pp. 170-178, 2003.

T. L. Perkinson, R. S. Gyurcsik, and P. K. MacLarty, "Single-wafer cluster tool performance: An analysis of the effects of redundant chambers and revisitations sequences on throughput," *IEEE Transactions on Semiconductor Manufacturing*, vol. 9, no. 3, pp. 384-400, 1996.

T. L. Perkinson, P. K. MacLarty, R. S. Gyurcsik, and R. K. Cavin, III, "Single-wafer cluster tool performance: An analysis of throughput," *IEEE Transactions on Semiconductor Manufacturing*, vol. 7, no. 3, pp. 369-373, 1994.

S. Sechi, C. Sriskandarajah, G. Sorger, J. Blazewicz, and W. Kubiak, "Sequencing of parts and robot moves in a robotic cell," *International Journal of Flexible Manufacturing Systems*, vol. 4, no. 3-4, pp. 331-358, 1992.

S. Venkatesh, R. Davenport, P. Foxhoven, and J. Nulman, "A steady state throughput analysis of cluster tools: Dual-blade versus single-blade robots," *IEEE Transactions on Semiconductor Manufacturing*, vol. 10, no. 4, pp. 418-424, 1997.

N. Q. Wu, "Necessary and Sufficient Conditions for Deadlock-free Operation in Flexible Manufacturing Systems Using a Colored Petri Net Model," *IEEE Transactions on Systems, Man, and Cybernetics, Part C*, vol. 29, no. 2, pp. 192-204, 1999.

N. Q. Wu, C. B. Chu, F. Chu, and M. C. Zhou, "A Petri net method for schedulability and scheduling problems in single-arm cluster tools with wafer residency time constraints," *IEEE Transactions on Semiconductor Manufacturing*, vol. 21, no. 2, pp. 224-237, 2008.

N. Q. Wu, F. Chu, C. Chu, and M. Zhou, "Petri Net-Based Scheduling of Single-Arm Cluster Tools With Reentrant Atomic Layer Deposition Processes," *IEEE Transactions on Automation Science and Engineering*, vol. 8, no. 1, pp. 42-55, January 2011.

N. Q. Wu, F. Chu, C. B. Chu, and M. C. Zhou, Petri net modeling and cycle time analysis of dual-arm cluster tools with wafer revisiting, *IEEE Transactions on Systems, Man, & Cybernetics: Systems*, vol. 43, no. 1, pp. 196-207, 2013a.

N. Q. Wu, M. C. Zhou, F. Chu, and C. B. Chu, "A Petri-net-based scheduling strategy for dual-arm cluster tools with wafer revisiting," *IEEE Transactions on Systems, Man, & Cybernetics: Systems*, vol. 43, no. 5, pp. 1182-1194, 2013b.

N. Q. Wu and M. C. Zhou, "Avoiding deadlock and reducing starvation and blocking in automated manufacturing systems based on a Petri net model," *IEEE Transactions on Robotics and Automation*, vol. 17, no. 5, pp. 658-669, 2001.

N. Q. Wu and M. C. Zhou, *System modeling and control with resource-oriented Petri nets*, CRC Press, Taylor & Francis Group, New York, October 2009.

N. Q. Wu and M. C. Zhou, "Analysis of wafer sojourn time in dual-arm cluster tools with residency time constraint and activity time variation," *IEEE Transactions on Semiconductor Manufacturing*, vol. 23, no. 1, pp. 53-64, 2010a.

N. Q. Wu and M. C. Zhou, "A closed-form solution for schedulability and optimal scheduling of dual-arm cluster tools based on steady schedule analysis," *IEEE Transactions on Automation Science and Engineering*, vol. 7, no. 2, pp. 303-315, 2010b.

N. Q. Wu and M. C. Zhou, "Modeling, analysis and control of dual-arm cluster tools with residency time constraint and activity time variation based on Petri nets," *IEEE Transactions on Automation Science and Engineering*, vol. 9, no. 2, pp. 446-454, 2012a.

N. Q. Wu and M. C. Zhou, "Schedulability analysis and optimal scheduling of dual-arm cluster tools with residency time constraint and activity time variation," *IEEE Transactions on Automation Science and Engineering*, vol. 9, no. 1, pp. 203-209, 2012b.

F. J. Yang, N. Q. Wu, Y. Qiao, and M. C. Zhou, Petri net-based optimal one-wafer cyclic scheduling of hybrid multi-cluster tools in wafer fabrication, *IEEE Transactions on Semiconductor Manufacturing*, vol. 27, no. 2, pp. 192-203, 2014a.

F. J. Yang, N. Q. Wu, Y. Qiao, and M. C. Zhou, "Petri net-based polynomially complex approach to optimal one-wafer cyclic scheduling of hybrid multi-cluster tools in semiconductor manufacturing," *IEEE Transactions on System, Man, & Cybernetics: System*, vol. 44, no. 12, pp. 1598-1610, 2014b.

F. J. Yang, N. Q. Wu, Y. Qiao, and M. C. Zhou, "Finding One-wafer Cyclic Schedule with Highest Productivity for Treelike Hybrid Multi-Cluster Tools," working paper, Macau University of Science and Technology, 2015.

J. G. Yi, S. W. Ding, D. Z. Song, and M. T. Zhang, "Steady-State Throughput and Scheduling Analysis of Multi-Cluster Tools for Semiconductor Manufacturing: A Decomposition Approach," *IEEE Transactions on Automation Science and Engineering*, vol. 5, no. 2, pp. 321-336, 2008.

M. C. Zhou and K. Venkatesh, *Modeling, simulation and control of flexible manufacturing systems: Petri net approach*, World Scientific, Singapore, 1998.

Q. H. Zhu, N. Q. Wu, Y. Qiao, and M. C. Zhou, "Petri net-based optimal one-wafer scheduling of single-arm multi-cluster tools in semiconductor manufacturing," *IEEE Transactions on Semiconductor Manufacturing*, vol. 26, no. 4, 578-591, 2013.

Q. H. Zhu, N. Q. Wu, Y. Qiao, and M. C. Zhou, "Scheduling of single-arm multi-cluster tools with wafer residency time constraints in semiconductor manufacturing," *IEEE Transactions on Semiconductor Manufacturing*, vo. 28, no. 1, pp. 117-125, 2015.

W. M. Zuberek, "Timed Petri nets in modeling and analysis of cluster tools," *IEEE Transactions on Robotics Automation*, vol. 17, no. 5, pp. 562-575, October 2001.

There follows a list of patent(s) and patent application(s) that are occasionally cited in the specification.

D. Jevtic and S. Venkatesh, "Method and Apparatus for Scheduling Wafer Processing within a Multiple Chamber Semiconductor Wafer Processing Tool Having a Multiple Blade Robot," U.S. Pat. No. 6,224,638 B1, May 1, 2001.

DESCRIPTION OF RELATED ART

As a kind of integrated equipment that implements single-wafer processing technology, cluster tools play a significant role in the semiconductor manufacturing industry [Yi et al., 2008; and Chan et al., 2007]. Generally, it integrates a wafer handling robot, two loadlocks, and a few process modules (PMs). A tool is called a single or dual-arm tool if its corresponding robot has one arm and two arms, respectively. The two loadlocks are for wafer cassette loading and unloading. Through them, raw wafers are loaded into the system with a cassette-by-cassette way and processed by PMs in a pre-specified order, called a recipe. At each step, they should stay in a PM for a certain of time to be processed and finally returns to the loadlock where it came from [Wu and Zhou, 2010b].

Multi-cluster tools are increasingly adopted to accommodate the industrial demands [Chan et al., 2007]. They are composed of several, individual cluster tools connected by buffering modules (BMs) with a linear or treelike topology. It is called a hybrid K-cluster tool if it contains K ($\geq 2$) individual cluster tools including both single and dual-arm tools. A treelike hybrid 9-cluster tool linked by BMs is illustrated in FIG. 1.

For effectively operating cluster tools, extensive research efforts have been made on the modeling and performance evaluation of them [Venkatesh et al., 1997; Perkinson et al., 1994 and 1996; Zuberek, 2001; Wu et al., 2011, 2013a, and 2013b; and Wu and Zhou, 2010a, 2012a, and 2012b]. These studies show that, with two loadlocks, a cluster tool often operates under a steady state. In the steady state, if the robot has idle time and processing time in PMs decides the cycle time of the system, it is process-bound. In practice, the robot activity time can be treated as a constant and is much shorter than wafer processing time [Kim et al., 2003]. Hence, often a tool is process-bound. Under such a case, for dual-arm tools, a swap strategy is effective [Venkatesh et al., 1997], while for single-arm ones, a backward strategy is optimal [Lee et al., 2004; Lopez and Wood, 2003].

For scheduling a multi-cluster tool, Jevtic [2001] proposes a heuristic algorithm. However, it is hard to evaluate its performance. By ignoring the robot moving time, the multi-cluster tool is modeled by an event graph combined with a network model in [Ding et al., 2006]. Then, the method finds all optimal periodical schedules based on a simulation approach. In [Yi et al., 2008], a decomposition method is presented. With the robot moving time taking into account, a polynomial algorithm is proposed to find an optimal cyclic schedule for both single-arm 2-cluster tools and m-serial-cluster tool in a treelike M-cluster tool with M>m. 2, in [Chan et al., 2011a and 2011b]. An m-serial-cluster tool is an m-cluster tool with linear topology. By the methods proposed in [Chan et al., 2011a and 201 ib], generally, the obtained cyclic schedule is a multi-wafer schedule, i.e. more than one wafer is produced during every period [Sechi et al., 1992].

Due to that a one-wafer cyclic schedule is easy to understand, implement, and control, it is the most desired one in practice, assuming that the same maximum throughput is achieved. A multi-cluster tool with its bottleneck tool being process-bound is said to be process-dominant in [Zhu et al., 2013, 2015]. It is shown that, for a process-dominant single-arm multi-cluster tool with linear topology, there is always a one-wafer cyclic schedule and a polynomial method is proposed to find an optimal one-wafer cyclic schedule ($O^2CS$), in [Zhu et al., 2013]. A multi-cluster tool composed of both single and dual-arm tools is called a hybrid multi-cluster tool. Similar to a process-dominant linear single-arm multi-cluster tool, there is a one-wafer cyclic schedule for process-dominant linear hybrid multi-cluster tools and efficient algorithms are presented to find an $O^2CS$ in [Yang et al., 2014a and 2014b]. Structurally, a treelike hybrid multi-cluster tool is much more complex than a linear multi-cluster tool and thus it is more challenging to schedule. In our previous work [Yang et al., 2015], conditions under which a one-wafer cyclic schedule exists to reach the lower bound (LB) of cycle time for a process-dominant treelike hybrid K-cluster tool are presented, and also, an efficient algorithm is proposed to find such a schedule if it exists. However, if it does not exist, it is open that whether there is an O²CS and how it can be found if yes.

There is a need in the art to determine if the O²CS exists and, if it exists, to develop and apply the O²CS for scheduling a treelike hybrid multi-cluster tool.

SUMMARY OF THE INVENTION

An aspect of the present invention is to provide a computer-implemented method for scheduling a treelike hybrid K-cluster tool to generate a one-wafer cyclic schedule. The treelike hybrid K-cluster tool has K single-cluster tools denoted as $C_1, C_2, \ldots, C_K$, with $C_1$ being a head tool of the treelike hybrid K-cluster tool. The single-cluster tool $C_k$, $k \in \mathbb{N}_K$, has a robot $R_k$ for wafer handling. The method comprises given a value of cycle time, generating a part of the schedule for a section of the K-cluster tool by performing a generating algorithm where the section of the K-cluster tool is either an EST or a ST.

The generating algorithm for $EST_k$ or $ST_k$, with $C_i$ being a downstream adjacent tool of $C_k$ and with $\Theta$ being the given value of cycle time for $EST_i$, $ST_i$ or $B_i$, comprises the following steps. The notations and symbols used in the steps are defined hereinafter in the specification.

In Step (S1), perform Steps (S1.1), (S1.2) and (S1.3) if $\Theta$ is not an optimal cycle time for $EST_k$ or $ST_k$, and if $k \notin F$ and $A_{i(n[i])} \neq 0$.

In Step (S1.1), calculate $\Delta_m$'s for $m \in S_i$ according to $$\Delta_m = A_{m(n[m])}/\Sigma_{p \in S_m} B[p] \text{ if } m > i$$

and $$\Delta_m = \Delta_i = \begin{cases} \Phi_i(S, S) - A_{i(n[i])} & \text{for Condition 1,} \\ \dfrac{\Phi_i(S, S)}{1 + \Sigma_{p \in S_i} B[p]} & \text{for Condition 2, if } m = i, \\ \dfrac{\Phi_i(D, S)}{1 + \Sigma_{p \in S_i} B[p]} & \text{for Condition 3,} \end{cases}$$

where Condition 1 is that $$0 < A_{i(n[i])} \leq \frac{\Sigma_{p \in S_i} B[p] \times \Phi_i(S, S)}{1 + \Sigma_{p \in S_i} B[p]}$$

and S-S case is considered,
Condition 2 is that $$A_{(i+1)(n[i+1])} \geq \frac{\Sigma_{p \in S_i} B[p] \times \Phi_i(S, S)}{1 + \Sigma_{p \in S_i} B[p]}$$

and S-S case is considered, and
Condition 3 is that D-S case is considered.

In Step (S1.2), check whether $\Delta = \min\{\Delta_p | p \in S_i\} = \Delta_I$ is satisfied. If it is satisfied, then perform Steps (S1.2.1), (S1.2.2) and (S1.2.3) with:
$Y = \Phi_i(S,S) - A_{i(n[i])}$ when Condition 1 is satisfied;

$$Y = \frac{\Phi_i(S, S)}{1 + \Sigma_{p \in S_i} B[p]}$$

when Condition 2 is satisfied; and $$Y = \frac{\Phi_i(D, S)}{1 + \Sigma_{p \in S_i} B[p]}$$

when Condition 3 is satisfied.

Step (S1.2.1) is as follows. In $EST_i$ or $B_i$, for $p \notin S_i$, if $p \notin L$, then set $\omega_{p((b[p]\_1)-1)} = A_{p((b[p]\_1)-1)} + \Delta$, else set $\omega_{p0} = A_{p0} + \Delta$.

Step (S1.2.2) is as follows. In $EST_i$ or $B_i$, if $p \in S_i$ and $p \notin F$, then set:

$\omega_{pj} = A_{pj} + Y$ for $j \in D[p]$, or for $j \in \mathbb{N}_{n[p]} \backslash \{n[p]\}$ if $p \in L$;

$\omega_{p((b[p]\_1)-1)} = A_{p((b[p]\_1)-1)} + \Sigma_{q \in S_p} B[q] \times A_{i(n[i])}/ (\Sigma_{p \in S_i} B[p]) + \Delta$, or $\omega_{p0} = A_{p0} + \Delta$ if $p \in L$; and $\omega_{p(n[p])} = A_{p(n[p])} - \Sigma_{q \in S_p} B[q] \times Y$.

Step (S1.2.3) is as follows. In $EST_i$, if $p \in S_i$ and $p \in F$, then set:

$\omega_{pj} = A_{pj} + Y, j \in D[p]$;

$\omega_{p((b[p]\_1)-1)} = A_{p((b[p]\_1)-1)} + \sum_{q \in S_{p\_1}} B[q] \times Y + \Delta$;

$\omega_{p((b[p]\_d)-1)} = A_{p((b[p]\_d)-1)} + \left( \sum_{q \in S_{p\_d}} B[q] + 1 \right) \times Y$, $d \in \{2, 3, \ldots, f[p]\}$;

and $\omega_{p(n[p])} = A_{p(n[p])} - \Sigma_{q \in S_p} B[q] \times Y$;

In Step (S1.3), if $\Delta = \min\{\Delta_p | p \in S_i\} = \Delta_f \neq \Delta_i$, then perform Steps (S1.2.1), (S1.2.2) and (S1.2.3) with $Y = \Delta_f$ followed by repeating Steps (S1.1), (S1.2) and (S1.3).

Preferably, the generating algorithm further comprises Steps (S2), (S3), (S3.1), (S3.2) and S(3.3) as follows.

Step (S.2) is performed if $\Theta$ is not an optimal cycle time for $EST_k$ or $ST_k$, and if $k \notin F$ and $\Delta_{i(n[i])} = 0$. If this condition is satisfied, then $\Theta$ is updated with a value computed by $\Theta + \Delta_i = \Theta + \Phi_i(S, S)$ for S-S case, or by $\Phi_i(D, S)$ for D-S case. Based on the updated value of $\Theta$, the robot waiting times for the robots in $EST_k$ or $ST_k$ are recomputed, so that the part of the schedule for $EST_k$ or $ST_k$ is generated and thereby the performing of the generating algorithm is completed.

In Step (S.3), it is first checked if $\Theta$ is not an optimal cycle time for $EST_k$ or $ST_k$, and if $k \in F$ holds. If both answers are yes, then Steps (S3.1), (S3.2) and (S3.3) are performed.

Step (S3.1) is to find the optimal cycle time $\Theta + \Delta_q$ for $C_k$ with $EST_{k\_q}$ or $ST_{k\_q}$, $q \in \mathbb{N}_{f[k]}$, by performing Steps (S.1) and (S.2), where $EST_{k\_q}$ or $ST_{k\_q}$ is the EST or the ST having the single-cluster tool $C_i$ and a branch thereof, $B_{i\_q}$.

Step (S3.2) is to update $\Theta$ with a value computed by $\Theta + \max\{\Delta_1, \Delta_2, \ldots, \Delta_{f[k]}\}$.

Step (S3.3) is to find the part of the schedule for $ST_k$ by recomputing the robot waiting times with the updated cycle time $\Theta$.

With the generating algorithm, one can find an O²CS for the K-cluster tool as follows. The O²CS for the smallest ST, say, $ST_j$ with $j = \max_{l \in F}\{l\}$ and its ESTs is obtained first by the generating algorithm. Afterwards, the ST that is larger than $ST_j$ is processed with the generating algorithm. This process is continued until it is done for the K-cluster tool to obtain a complete O²CS.

It follows that the method as disclosed herein may advantageously include a procedure as follows. First identify, in the treelike hybrid K-cluster tool, $ST_j$ with $j=\max_{l\in F}\{l\}$, and one or more ESTs of $ST_j$. The one or more ESTs are $EST_{j-1}$, $EST_{j-2}$ down to $EST_i$ such that an upstream adjacent tool of $C_i$ is a fork tool. A first part of the schedule for $ST_j$ is determined by performing the generating algorithm. Then a second part of the schedule for $EST_{j-1}$ is determined based on the first part of the schedule. Repeat the determination of one part of the schedule $EST_{j-m}$ based on a determined part of the schedule for $EST_{j-m+1}$ until the one or more ESTs are scheduled.

Other aspects of the present invention are disclosed as illustrated by the embodiments hereinafter.

DETAILED DESCRIPTION

Based on the results obtained in [Yang et al., 2015], the present work confirms that an O²CS exists for a treelike hybrid multi-cluster tool. To do so, a Petri net (PN) model is developed to describe the dynamic behavior of the system. By this model, one shows that there is always a one-wafer cyclic schedule. Then, algorithms are designed to obtain the O²CS by setting the robot waiting time. The method as disclosed herein is shown to be computationally efficient.

Hereinafter, the notation $\mathbb{N}_K$, K being a positive integer, denotes a set containing positive integers from 1 to K, i.e. $\mathbb{N}_K=\{1, 2, \ldots, K\}$. Let $\Omega_K=\{0\}\cup\mathbb{N}_K$.

A. Petri Net Modeling

By following Chan et al. [2011a and b], for the system, one assumes that: 1) the capacity of a BM is one and has no processing function; 2) only one PM is configured for each step, that is, there is no parallel module, and only one wafer can be processed in a PM at a time; 3) only one type of wafers that have the identical recipe is processed, and they visit a PM only once except entering a BM at least twice; 4) the activity time is a known constant; and 5) in each individual tool except the fork and leaf (to be defined later) tool, besides BM(s), there is at least one PM. The fork tool may have no PM and the leaf tool has at least two PMs.

Figure 1:
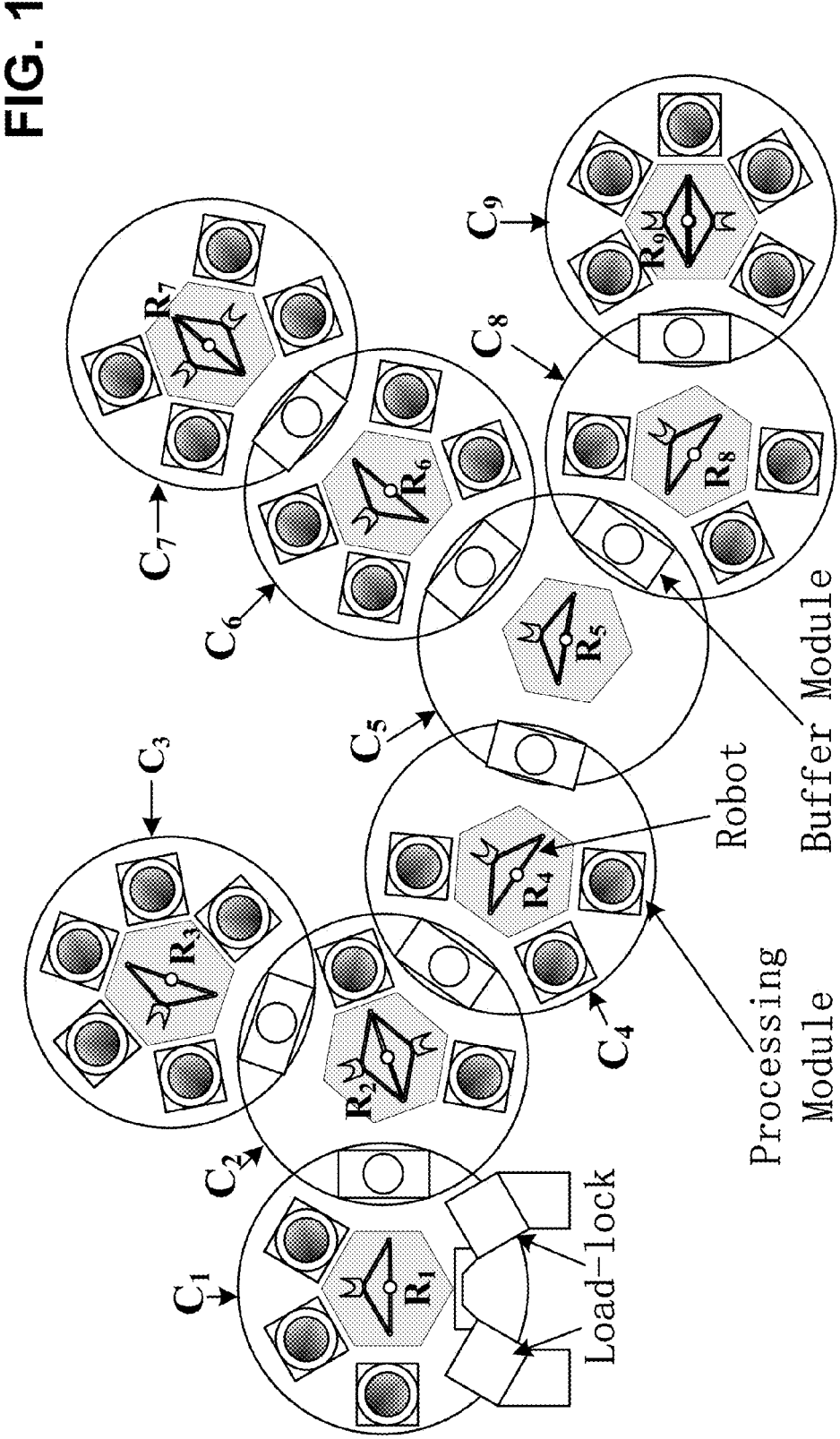
FIG. 1 depicts a treelike hybrid 9-cluster tool as an example for illustration.

Let $C_i$, $i\in\mathbb{N}_K$, denote the i-th cluster tool, where $C_1$ that has two loadlocks is called the head tool; $C_i$, $i\neq 1$, is called a leaf tool if it connects to only one tool; and if $C_i$, $i\in\mathbb{N}_K$, connects to at least three adjacent tools, it is called a fork tool. Denote $R_i$ as the robot in $C_i$. As shown in FIG. 1, $C_3$, $C_7$, and $C_9$ are leaf tools, while $C_2$ and $C_5$ are fork ones. Let $L=\{i|C_i$ is a leaf tool$\}$ denote the index set of leaf tools. The tools are numbered such that, for any two adjacent tools $C_k$ and $C_i$, $k\notin L$ and $i\in\{1\}$, with $C_k/C_i$ being the upstream/downstream one, one has $i>k$ [Chan et al. 2011b]. However, k and i may not be in a consecutive order.

A BM connecting $C_k$ and $C_i$ is seen as the outgoing module (OM) for $C_k$ and the incoming module (IM) for $C_i$, respectively, and this IM is numbered as the Step 0 for $C_i$. Let n[i] be the index for the last step in $C_i$, $i\in\mathbb{N}_K$. Then, there are n[i]+1 steps in $C_i$, including the OM(s) and IM(s). Let f[i], $1\leq f[i]\leq n[i]$, denote the number of OM(s) in $C_i$, $i\notin L$. If f[i]>1, $C_i$ is a fork tool; otherwise if f[i]=1, it is not. Let $PS_{ij}$ denote Step j (except the BM(s)) in $C_i$, $i\in\mathbb{N}_K$ and $j\in\mathbb{N}_{n[i]}$, with $PS_{10}$ denoting the loadlocks in $C_1$. Further, let $PS_{i(b[i]\_1)}$, $PS_{i(b[i]\_2)}$, $\ldots$, and $PS_{i(b[i]\_f[i])}$ with $b[i]\_1<b[i]\_2<\ldots<b[i]\_f[i]$, denote the OM(s). Note that $b[i]\_1$, $b[i]\_2$, $\ldots$ and $b[i]\_f[i]$ are not necessary in a consecutive order, in other words, $b[i]\_2=b[i]\_1+1$ may not hold. The IM for $C_i$ is denoted as $PS_{i0}$. Then, the n[i]+1 steps in $C_i$ are denoted as $PS_{i0}$, $PS_{i1}$, $\ldots$, $PS_{i(b[i]\_1)}$, $\ldots$, $PS_{i(b[i]\_2)}$, $\ldots$, $PS_{i(n[i])}$, respectively. Notice that $b[i]\_1=1$ if it is Step 1 and $b[i]\_f[i]=n[i]$ if it is the last step. By this way, the route of a wafer in FIG. 1 can be denoted as: $PS_{10}\to PS_{11}\to \ldots \to PS_{1(b[1]\_1)}$ $(PS_{20})\to PS_{2(b[2]\_1)}$ $(PS_{30})\to PS_{31}\to \ldots \to PS_{30}$ $(PS_{2(b[2]\_1)})\to \ldots \to PS_{2(b[2]\_2)}$ $(PS_{40})\to \ldots \to PS_{4(b[4]\_1)}$ $(PS_{50})\to \ldots \to PS_{50}$ $(PS_{4(b[4]\_1)})\to \ldots \to PS_{40}$ $(PS_{2(b[2]\_2)})\to \ldots \to PS_{20}$ $(PS_{1(b[1]\_1)})\to PS_{10}$.

The present work extends the resource-oriented PN developed in [Wu, 1999; and Wu and Zhou, 2001 and 2009] to model a treelike hybrid K-cluster tool. The basic concept of the PN used in the present work is based on [Zhou and Venkatesh, 1998; Wu, 1999; and Wu and Zhou 2009]. As a kind of finite capacity PN, it is defined as PN=(P, T, I, O, M, $\mathcal{K}$), where P=$\{p_1, p_2, \ldots, p_m\}$ is a finite set of places and T=$\{t_1, t_2, \ldots, t_n\}$ is a finite set of transitions; I/O is the input/output functions; M(p) is a marking representing the number of tokens in place p with $M_0(p)$ being the initial marking in p; and $\mathcal{K}$ is a capacity function with $\mathcal{K}(p)$ being the largest number of tokens that p can hold at a time. Transition t's preset is the set of all input places to t, namely, $^\bullet t=\{p: p\in P$ and $I(p, t)>0\}$. Its postset is the set of all output places from t, namely, $t^\bullet=\{p: p\in P$ and $O(p, t)>0\}$. Similarly, one has p's preset $^\bullet p=\{t\in T: O(p, t)>0\}$ and postset $p^\bullet=\{t\in T: I(p, t)>0\}$. For the transition enabling and firing rules, one can refer to [Wu, 1999; Wu and Zhou, 2001 and 2010c].

A.1. PN for Hybrid K-Cluster Tools

Figure 2:
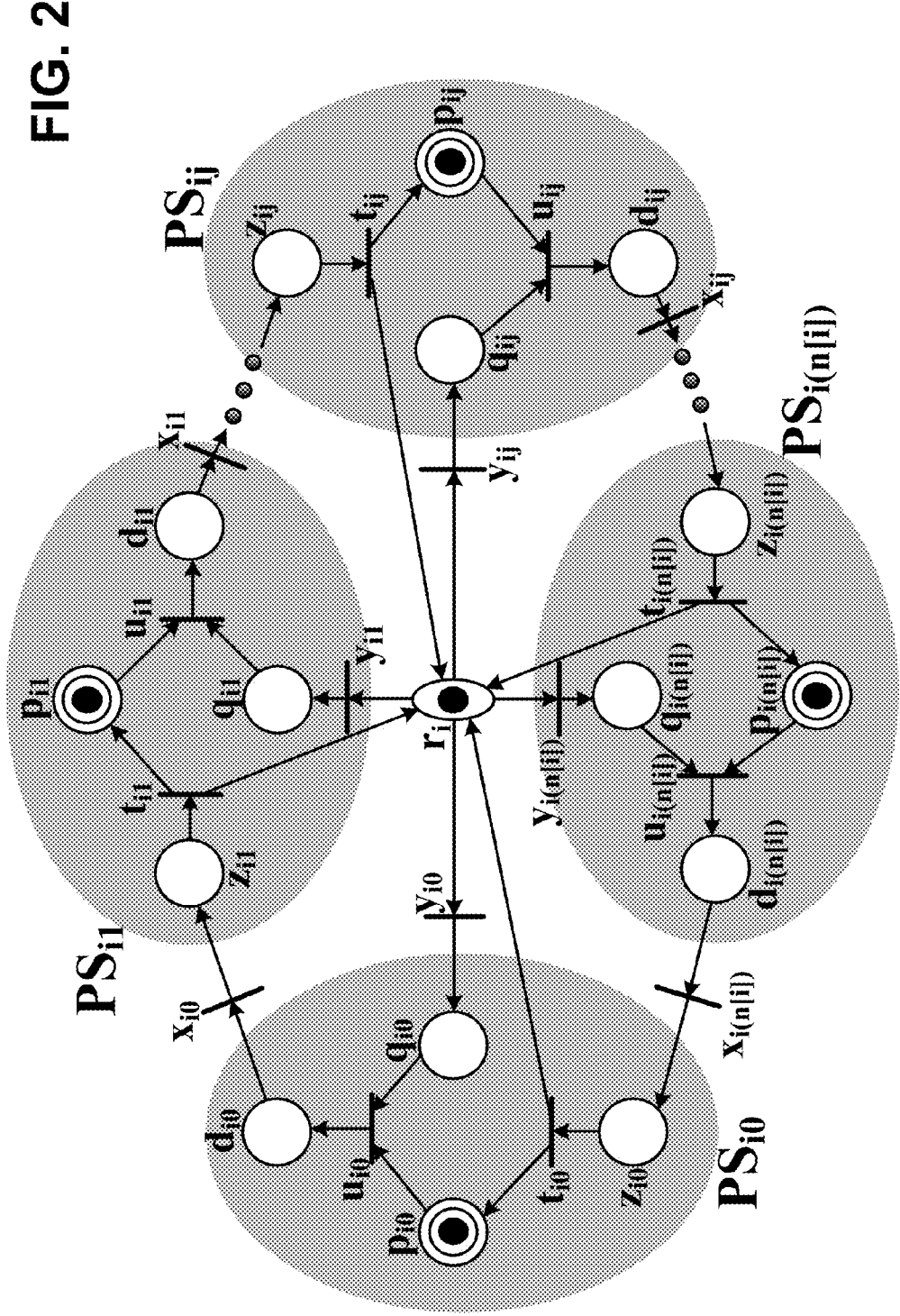
FIG. 2 depicts a PN model for a single-arm tool $C_i$ as an illustrative example.
Figure 3:
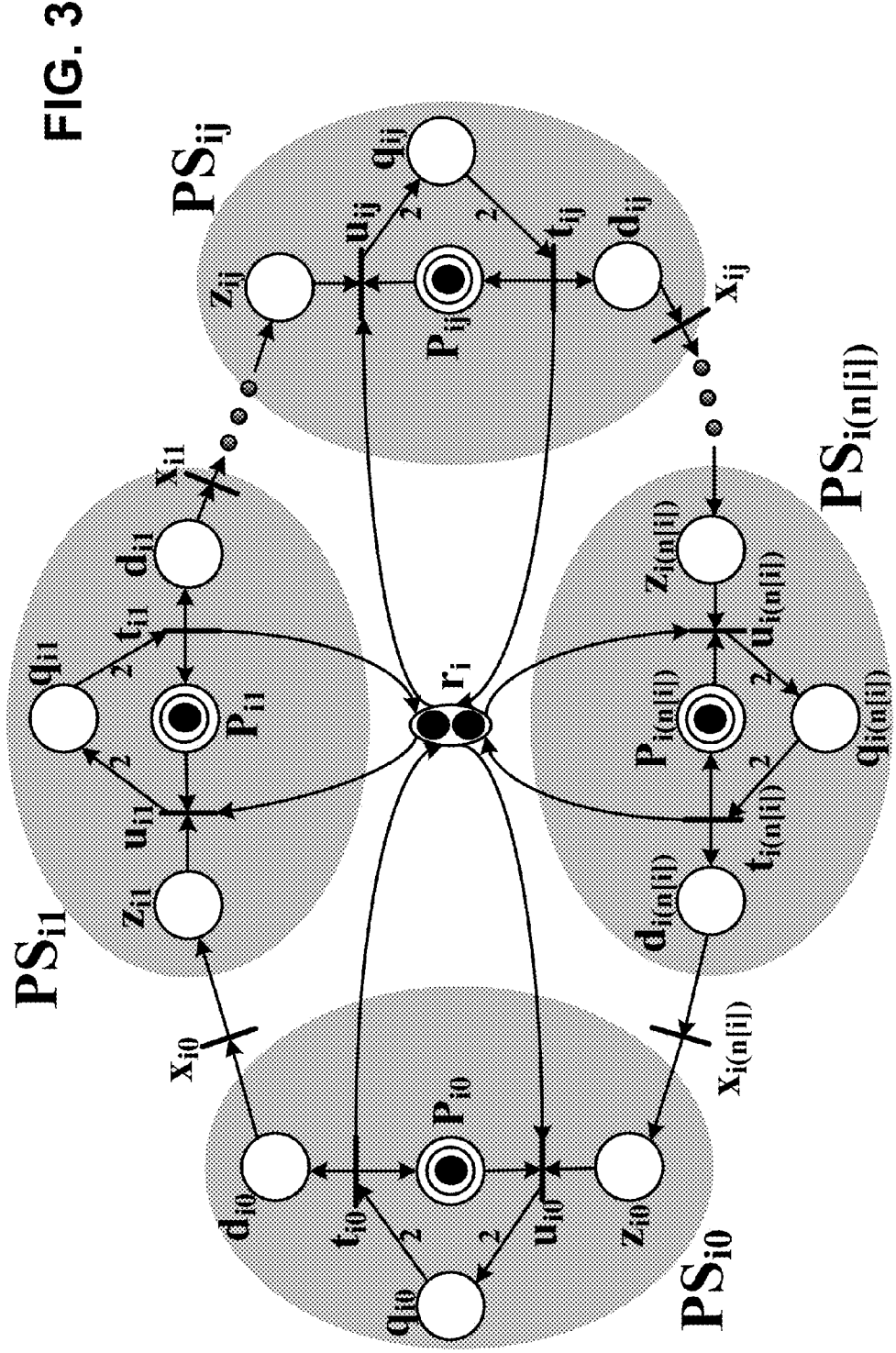
FIG. 3 depicts, as an example, a PN model for a dual-arm tool $C_i$.

To model a hybrid K-cluster tool, one adopts the PN models developed in [Yang et al., 2015] with the backward and swap strategies for the single and dual-arm tool as shown in FIGS. 2 and 3, respectively. A brief introduction to them is presented for self-completeness as follows. Note that for convenience, a token and a wafer are often used without difference.

For $C_i$, $i\in\mathbb{N}_K$, regardless of whether it is a single or dual-arm tool, transition $x_{ij}$, $j\in\Omega_{n[i]}$, models $R_i$'s moving from Steps j to j+1 (or Step 0 if j=n[i]) with a wafer hold, and places $r_i$ and $p_{ij}$, model $R_i$ and $PS_{ij}$, $j\in\Omega_{n[i]}$, respectively. Note that $\mathcal{K}(p_{ij})=1$ indicating that there is only one PM for a step; and $\mathcal{K}(r_i)=1$ if $C_i$ is a single-arm tool and $\mathcal{K}(r_i)=2$ if $C_i$ is a dual-arm tool. For a single-arm tool $C_i$, $i\in\mathbb{N}_K$, as shown in FIG. 2, place $q_{ij}$ with $\mathcal{K}(q_{ij})=1$ models $R_i$'s waiting before unloading a wafer (token) from $p_{ij}$, $j\in\Omega_{n[i]}$. Places $d_{ij}$ and $z_{ij}$ with $\mathcal{K}(d_{ij})=\mathcal{K}(z_{ij})=1$ model that $R_i$ holds a wafer for moving from Steps j to j+1 (or Step 0 if j=n[i]) and loading a wafer into $p_{ij}$, $j\in\Omega_{n[i]}$, respectively. Transitions $u_{ij}$ and $t_{ij}$ model that $R_i$ removes a wafer from $p_{ij}$, and drops a wafer into $p_{ij}$, $j\in\Omega_{n[i]}$, respectively. Transition $y_{ij}$, $j\in\Omega_{n[i]}\setminus\{0, 1\}$, models $R_i$'s moving from Steps j+2 to j (or to n[i]−1 if j=0, or to n[i] if j=1), without carrying a wafer.

For a dual-arm tool $C_i$, $i \in \mathbb{N}_K$, as shown in FIG. 3, places $d_{ij}$ and $z_{ij}$ with $K(d_{ij})=K(z_{ij})=1$ model the state that a swap ends and $R_i$'s waiting before unloading a wafer from $p_{ij}$, $j \in \Omega_{n[i]}$, respectively. Place $q_{ij}$ with $K(q_{ij})=2$ models that both arms of $R_i$ hold a wafer and wait during swap at $p_{ij}$, $j \in \Omega_{n[i]}$. Transitions $t_{ij}$ and $u_{ij}$ model $R_i$'s loading and unloading a wafer into and from $p_{ij}$, $j \in \Omega_{n[i]}$, respectively. By firing $u_{ij}$, two tokens enter $q_{ij}$, implying that both arms hold a wafer and wait. For more details, the readers can refer to [Wu et al., 2008] and [Wu and Zhou, 2010b].

For a BM that connects $C_k$ and $C_i$, $k \notin L$, $i \notin \{1\}$, with $C_k$ being the upstream one, there are four different cases:

1) both $C_k$ and $C_i$ are dual-arm tools (herein referred to as a D-D case in short);
2) $C_k$ is a single-arm tool and $C_i$ is a dual-arm one (herein referred to as a S-D case in short);
3) $C_k$ is a dual-arm tool and $C_i$ is a single-arm one (herein referred to as a D-S case in short); and
4) both are single-arm tools (herein referred to as a S-S case in short).

Figure 4:
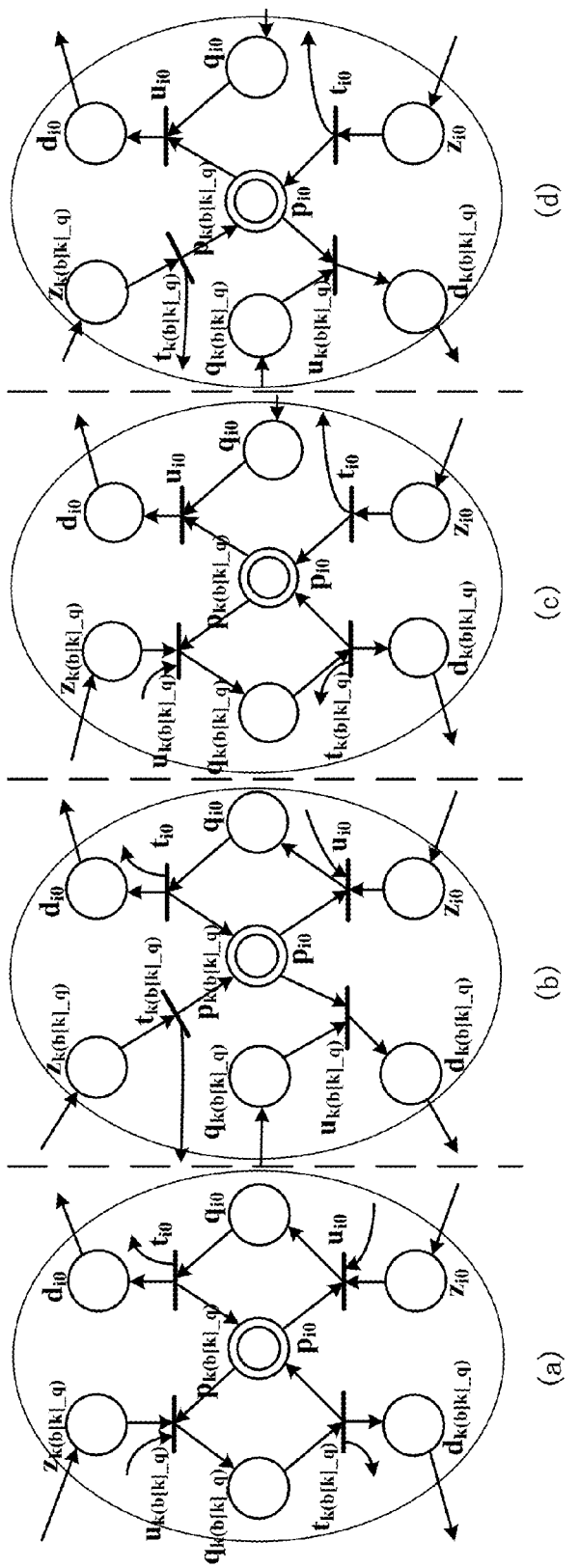
FIG. 4 depicts examples of a PN model for the BM between $C_k$ and $C_i$ for: (a) a D-D case; (b) a S-D case, (c) a D-S case; and (d) a S-S case.

As the BM linking $C_k$ and $C_i$ can be treated as a step denoted by $PS_{k(b[k]\_q)}$ for $C_k$, or the q-th OM, $1 \leq q \leq f[k]$, in $C_k$, and it is also seen as $PS_{i0}$ in $C_i$. Hence, this BM is modeled by $p_{k(b[k]\_q)}$ and $p_{i0}$ for $C_k$ and $C_i$, respectively, with $p_{k(b[k]\_q)} = p_{i0}$ and $K(p_{k(b[k]\_q)}) = K(p_{i0}) = 1$. The PN models of the four cases are shown in FIG. 4. For the S-S case, Step b[k]_q for $C_k$ is modeled by $z_{k(b[k]\_q)}$, $t_{k(b[k]\_q)}$, $p_{k(b[k]\_q)}$, $q_{k(b[k]\_q)}$, $u_{k(b[k]\_q)}$, and $d_{k(b[k]\_q)}$ together with arcs $(z_{k(b[k]\_q)}, t_{k(b[k]\_q)})$, $(t_{k(b[k]\_q)}, p_{k(b[k]\_q)})$, $(p_{k(b[k]\_q)}, u_{k(b[k]\_q)})$, $(q_{k(b[k]\_q)}, u_{k(b[k]\_q)})$, and $(u_{k(b[k]\_q)}, d_{k(b[k]\_q)})$. Step 0 for $C_i$ is modeled by $z_{i0}$, $t_{i0}$, $p_{i0}$, $q_{i0}$, $u_{i0}$, and $d_{i0}$ together with arcs $(z_{i0}, t_{i0})$, $(t_{i0}, p_{i0})$, $(p_{i0}, u_{i0})$, $(q_{i0}, u_{i0})$, and $(u_{i0}, d_{i0})$ as shown in FIG. 4(d). Similarly, one can obtain the models for the other cases.

With the developed PN, the initial marking $M_0$ of the PN model can be set by putting a V-token representing a virtual wafer (not real one) as follows.

For $C_1$, set $M_0(p_{10})=n$, representing that there are always wafers to be processed. If $C_1$ is a single-arm tool, set $M_0(r_1)=0$; $M_0(p_{1(b[i]\_1)})=0$ and $M_0(p_{1j})=1$, $j \in \mathbb{N}_{n[1]} \setminus \{b[1]\_1\}$; $M_0(z_{1j})=M_0(d_{1j})=0$, $j \in \Omega_{n[1]}$; $M_0(q_{1j})=0$, $j \in \Omega_{n[1]} \setminus \{(b[1]\_1)-1\}$, and $M_0(q_{1((b[1]\_1)-1)})=1$, implying that $R_1$ is waiting at $PS_{1((b[1]\_1)-1)}$ for unloading a wafer there. If $C_1$ is a dual-arm tool, set $M_0(r_1)=1$; $M_0(p_{1j})=1$, $j \in \mathbb{N}_{n[1]}$; $M_0(q_{1j})=M_0(d_{1j})=0$, $j \in \Omega_{n[1]}$; $M_0(z_{1j})=0$, $j \in \Omega_{n[1]} \setminus \{b1\_1\}$ and $M_0(z_{1(b[1]\_1)})=1$, implying that $R_1$ is waiting at $PS_{1(b[i]\_1)}$ for unloading a wafer there.

For a single-arm tool $C_i$, $i \in \mathbb{N}_K \setminus \{1\}$, $M_0(r_i)=0$; $M_0(z_{ij})=M_0(d_{ij})=0$, $j \in \Omega_{n[i]}$; $M_0(p_{i1})=0$ and $M_0(p_{ij})=1$, $j \in \mathbb{N}_{n[i]} \setminus \{1\}$; $M_0(q_{ij})=0$, $j \in \mathbb{N}_{n[i]}$, and $M_0(q_{i0})=1$, representing that $R_i$ is waiting at $PS_{i0}$ for unloading a wafer there. For a dual-arm tool $C_i$, $i \in \mathbb{N}_K \setminus \{1\}$, set $M_0(r_i)=1$; $M_0(p_{ij})=1$, $j \in \mathbb{N}_{n[i]}$; $M_0(q_{ij})=M_0(d_{ij})=0$, $j \in \Omega_{[n]}$; $M_0(z_{ij})=0$, $j \in \mathbb{N}_{n[i]}$, and $M_0(z_{i0})=1$, representing that $R_i$ is waiting at $PS_{i0}$ for unloading a wafer there. It should be pointed out that, at $M_0$, for any adjacent $C_k$ and $C_i$, the token in $p_{i0}$ is assumed to enable $u_{k(b[k]\_q)}$, but not $u_{i0}$.

In FIG. 4, for place $p_{i0}$ ($p_{k(b[k]\_q)}$), there are two output transitions $u_{k(b[k]\_q)}$ and $u_{i0}$, leading to a conflict. However, a token entering $p_{i0}$ by firing $t_{k(b[k]\_q)}$ should enable $u_{i0}$, while the one entering $p_{i0}$ by firing $t_{i0}$ should enable $u_{k(b[k]\_q)}$. To avoid such a conflict, one introduces colors into the model. one first defines the color for the transition as follows.

Definition 1:

The color of a transition $t_i$ is defined as $C(t_i)=\{c_i\}$.

By Definition 1, the colors for $u_{i0}$ and $u_{k(b[k]\_q)}$ are $c_{i0}$ and $c_{k(b[k]\_q)}$, respectively. Then, one can define the color for a token as follows.

Definition 2:

If a token in $p \in {}^\bullet t_i$ enables $t_i$, it has the same color of $t_i$, i.e. $\{c_i\}$.

With Definition 2, a token entering $p_{i0}$ by firing $t_{k(b[k]\_q)}$ has color $c_{i0}$ and enables $u_{i0}$ only, and the token entering $p_{i0}$ by firing $t_{i0}$ has color $c_{k(b[k]\_q)}$ and enables $u_{k(b[k]\_q)}$ only. By this way, the PN becomes conflict-free. One more issue is that although the model for a dual-arm tool is deadlock-free, the model for a single-arm one is deadlock-prone [Yang et al. 2015]. A control policy defined in [Yang et al. 2015] is applied to solve this problem.

Definition 3 [Yang et al. 2015]:

In the PN model of a treelike hybrid K-cluster tool, for a single-arm tool $C_i$, $i \in \mathbb{N}_K$, at marking M, $y_{ij}$, $j \in \Omega_{n[i]} \setminus \{n[i], (b[i]\_q)-1\}$ and $q \in \mathbb{N}_{f[i]}$, is control-enabled if $M(p_{i(j+1)})=0$; $y_{i(n[i])}$ is control-enabled if transition $t_{i1}$ has just been executed, and $y_{i((b[i]\_q)-1)}$ is control-enabled if transition $t_{i((b[i]\_q)+1)}$ has just been executed.

Thereafter, it is assumed that the PN is always controlled by the control policy given in Definition 3 such that the model is deadlock-free.

A.2. Modeling Activity Time

In the developed PN model, the time related activities are modeled by both transitions and places and time should be associated with both of them. As pointed out by Kim et al. [2003] and Lee and Lee [2006], for both single (S) and dual-arm (D) tools, the time for the robot to move from one step to another with or without carrying a wafer is identical, so is the time for the robot to unload/load a wafer from/into a PM. By following [Wu et al., 2008; and Wu and Zhou, 2010b], the activity time is modeled as shown in TABLE 1.

TABLE 1

Time duration associated with transitions and places for tool $C_i$.

| Symbol | Transitions/ places | Action | Time duration | Tool type |
|---|---|---|---|---|
| $\lambda_i$ | $t_{ij}$/ $u_{ij} \in T$ | $R_i$ loads/unloads a wafer into/from Step j, $j \in \Omega_{n[i]}$ | $\lambda_i$ | S |
| $\lambda_i$ | $u_{ij}$ and $t_{ij} \in T$ | $R_i$ Swaps at Step j, $j \in \Omega_{n[i]}$ | $\lambda_i$ | D |
| $\mu_i$ | $x_{ij} \in T$ | $R_i$ moves from a step to another with a wafer carried | $\mu_i$ | Both |
| $\mu_i$ | $y_{ij} \in T$ | $R_i$ moves from a step to another without a wafer carried | $\mu_i$ | S |
| $\alpha_{ij}$ | $p_{ij} \in P$ | A wafer is been processed in $p_{ij}$, $j \in \Omega_{n[i]}$ | $\alpha_{ij}$ | Both |
| $\tau_{ij}$ | $p_{ij} \in P$ | A wafer is been processed and is waiting in $p_{ij}$, $j \in \Omega_{n[i]}$ | $\geq \alpha_{ij}$ | Both |
| $\omega_{ij}$ | $q_{ij} \in P$ | $R_i$ waits before unloading a wafer from Step j, $j \in \Omega_{n[i]}$ | $\geq 0$ | S |
| $\omega_{ij}$ | $z_{ij} \in P$ | $R_i$ waits at $p_{ij}$, $j \in \Omega_{n[i]}$ | $\geq 0$ | D |
| $\omega_{ij1}$ | $q_{ij} \in P$ | $R_i$ waits during swap at $p_{ij}$, $j \in \Omega_{n[i]}$ | 0 | D |
|  | $d_{ij} \in P$ | No robot activity is associated | 0 | Both |
|  | $z_{ij} \in P$ | No robot activity is associated | 0 | S |

B. Timeliness Analysis of Individual Tools

With the above developed PN model, this section presents the temporal properties for individual tools to parameterize a schedule by robot waiting time. According to Wu et al.

[2008], for a single-arm tool $C_i$, $i \in \mathbb{N}_K$, the time taken for processing a wafer at Step j, $j \in \mathbb{N}_{n[i]}$, is $$\theta_{ij} = \alpha_{ij} + 4\lambda_i + 3\mu_i + \omega_{i(j-1)} \quad (1)$$

For Step 0, as $\alpha_{i0} = 0$, one has $$\theta_{i0} = 4\lambda_i + 3\mu_i + \omega_{i(n[i])} \quad (2)$$

With the robot waiting time being removed, the time needed for completing a wafer at Step j is $$\xi_{ij} = \alpha_{ij} + 4\lambda_i + 3\mu_i, j \in \Omega_{n[i]}. \quad (3)$$

To be feasible, a wafer should stay in $PM_{ij}$ for $\tau_{ij}$ ($\geq \alpha_{ij}$) time units. By replacing $\alpha_{ij}$ with $\tau_{ij}$, the cycle time at Step j in $C_i$ is computed by $$\pi_{ij}\tau_{ij} = +4\lambda_i + 3\mu_i + \omega_{i(j-1)}, j \in N_{n[i]} \quad (4)$$

and $$\pi_{ij} = \tau_{ij} + 4\lambda_i + 3\mu_i + \omega_{i(j0-1)}, j \in \Omega_{n[i]}. \quad (4)$$

The robot cycle time for a single-arm tool $C_i$ is $$\psi_i = 2(n[i]+1)(\lambda_i + \mu_i) + \sum_{j=0}^{n[i]} \omega_{ij} = \psi_{i1} + \psi_{i2} \quad (6)$$

where $\psi_{i1} = 2(n[i]+1)(\lambda_i + \mu_i)$ is the robot's activity time in a cycle without waiting and it is a known constant, while $\psi_{i2} = \Sigma_{j=0}^{n[i]} \omega_{ij}$ is the robot waiting time in a cycle.

For a dual-arm tool $C_i$, $i \in \mathbb{N}_K$, according to Wu et al. [2010a], the time needed for processing a wafer at Step j, $j \in \Omega_{n[i]}$, is $$\xi_{ij} = \alpha_{ij} + \lambda_i. \quad (7)$$

Similarly, by replacing $\alpha_{ij}$ with $\tau_{ij}$ in (7), the cycle time at Step j, $j \in \Omega_{n[i]}$, is $$\pi_{ij} = \tau_{ij} + \lambda_i. \quad (8)$$

The robot cycle time for a dual-arm tool $C_i$ is $$\psi_i = (n[i]+1)(\lambda_i + \mu_i) + \sum_{j=0}^{n[i]} \omega_{ij} = \psi_{i1} + \psi_{i2} \quad (9)$$

where $\psi_{i1} = (n[i]+1)(\lambda_i + \mu_i)$ is the robot cycle time in a cycle without waiting and $\psi_{i2} = \Sigma_{j=0}^{n[i]} \omega_{ij}$ is the robot's waiting time in a cycle.

Since the production process is serial for each tool $C_i$, $i \in \mathbb{N}_K$, the productivity for each step is identical. Thus, $C_i$ should be scheduled such that $$\pi_i = \pi_{i0} = \pi_{i1} = \ldots = \pi_{i(n[i])} = \psi_i. \quad (10)$$

Due to the fact that both $\pi_i$ and $\psi_i$ are functions of $\omega_{ij}$'s, the schedule for each tool $C_i$, $i \in \mathbb{N}_K$, is parameterized by robots' waiting time. With this observation in mind, the key for scheduling a treelike hybrid K-cluster tool is to determine $\omega_{ij}$'s such that the activities of the multiple robots are coordinated to act in a paced way.

C. Scheduling the Overall System

C.1. Schedule Properties

Let $\Pi_i = \max\{\xi_{i0}, \xi_{i1}, \ldots, \xi_{i(n[i])}, \psi_{(n[i])}\}$ denote the fundamental period (FP) of $C_i$, $i \in \mathbb{N}_K$. If $\Pi_i = \max\{\xi_{i0}, \xi_{i1}, \ldots, \xi_{i(n[i])}\}$, $C_i$ is process-bound. Let $\Pi = \max\{\Pi_1, \Pi_2, \ldots \Pi_K\} = \Pi_h$, $1 \leq h \leq K$, or $C_h$ is the bottleneck tool. Since, by assumption, a treelike hybrid K-cluster tool addressed here is process-dominant, $C_h$ must be process-bound. Let $\Theta$ be the cycle time of the system. Then, with $\pi_i$ being the cyclic time of $C_i$, to obtain a one-wafer cyclic schedule for the system, each individual tool must have an identical cycle time that is equal to $\Theta$ for the entire system, i.e.

$$\Theta = \pi_i \geq \Pi, \forall i \in \mathbb{N}_K. \quad (11)$$

From [Yang et al. 2015], each individual tool can be scheduled to be paced, if and only if, for any adjacent pair $C_k$ and $C_i$, $k \notin L$ and $i \notin \{1\}$, linked by $PS_{k(b[k]\_q)}$, $1 \leq q \leq f[k]$, at any marking M, one has: 1) whenever $R_i$ ($R_k$) is scheduled to load a token into $p_{i0}$ ($p_{k(b[k]\_q)}$), $M(p_{i0}) = 0$ ($M(p_{k(b[k]\_q)}) = 0$); and 2) whenever $R_i$ ($R_k$) is scheduled to unload a token from $p_{i0}$ ($p_{k(b[k]\_q)}$), $M(p_{i0}) = 1$ ($M(p_{k(b[k]\_q)}) = 1$). In [Yang et al. 2015], the existence of a one-wafer cyclic schedule with the LB of cycle time, i.e. OSLB for short, is discussed and conditions under which an OSLB exists are derived. Algorithm is developed to find it if it exists. This work conducts a study on the case that there is no OSLB and presents a method to find an $O^2CS$ with $\Theta > \Pi$.

C.2. Optimal One-Wafer Cyclic Scheduling

For a process-dominant treelike hybrid K-cluster tool, the conditions under which an OSLB can be found are given as follows [Yang, et al., 2015].

Lemma 1:

For a process-dominant treelike hybrid K-cluster tool, an OSLB exists, if and only if, for any adjacent pair $C_k$ and $C_i$, $k \notin L$, $i \notin \{1\}$, connected by $PS_{k(b[k]\_q)}$, the following conditions are satisfied by determining $\omega_{kj}$'s and $\omega_{il}$'s, $j \in \Omega_{n[k]}$ and $l \in \Omega_{n[i]}$ such that:

$$\pi_{kj} = \pi_{il} = \Pi, j \in \Omega_{n[k]} \text{ and } l \in \Omega_{n[i]}; \quad (12)$$

if $C_k$ and $C_i$ are D-S case, $$\Pi - 4\lambda_k \geq 4\lambda_i + 3\mu_i + \omega_{i(n[i])}; \quad (13)$$

and if $C_k$ and $C_i$ are S-S case, $$\Pi - (4\lambda_k + 3\mu_k + \omega_{k(b[k]\_q)-1}) \geq 4\lambda_i + 3\mu_i + \omega_{i(n[i])}; \quad (14)$$

Based on Lemma 1, an efficient algorithm is developed in [Yang, et al., 2015] to test the existence of an OSLB and find it if it exists. In the sequel, for a process-dominant treelike K-cluster tool, one shows that there is always a one-wafer cyclic schedule and present an efficient algorithm to find the minimal cycle time $\Theta > \Pi$ and $O^2CS$. In the following discussion, one focuses on the situation that there is no OSLB for the system.

Let $B_i$ denote a linear multi-cluster tool in a treelike K-cluster tool called a branch that starts from $C_i$ and ends at $C_m$, $m \in L$. For simplicity, one assumes that the tools in $B_i$ is labeled consecutively as $C_i$, $C_{i+1}$, . . . , $C_m$. Assume that, with $\Theta = \Pi$ as the cycle time, the conditions given in Lemma 1 are violated for a pair of $C_i$ and $C_{i+1}$ in $B_i$. Then, let $A_{kj} = \omega_{kj}$, $k = i+1, i+2, \ldots, m$, $j \in \Omega_{n[k]}$, where $\omega_{kj}$ is $R_k$'s waiting time obtained by the algorithm given in [Yang, et al., 2015] with cycle time $\Theta = \Pi$. Define $\Phi_{i+1}(S, S) = 4\lambda_{i+1} + 3\mu_{i+1} + A_{(i+1)(n[i+1])} - \Theta + 4\lambda_i + 3\mu_i$, when $C_i$ and $C_{i+1}$ are S-S, and $\Phi_{i+1}(D, S) = 4\lambda_{i+1} + 3\mu_{i+1} + A_{(i+1)(n[i+1])} - \Theta + \lambda_i$, when $C_i$ and $C_{i+1}$ are D-S. If $A_{(i+1)(n[i+1])} = 0$, it follows from [Yang et al., 2014b] that an $O^2CS$ with cycle time $\Theta = \Pi + \Phi_{i+1}(S, S)$ (or $\Pi + \Phi_{i+1}(D, S)$ if $C_i$ is a dual-arm tool) can be found for $B_i$. Otherwise, if $A_{(i+1)(n[i+1])} \neq 0$, assume that, for $g \in [i+1, m]$, $A_{k+1)(n[k+1])} > 0$, $i \leq k \leq g-1$, and $A_{(g+1)(n[g+1])} = 0$, or $C_{g+1}$ is a dual-arm one, or $g \in L$. Define $D[k] = \{PM_{kj} | j \neq (b[k]\_1) - 1$ and $j \neq n[k]\}$ be the set of steps in $C_k$, and $B[k] = n[k] - 1$, $k = i+1$, $i+2, \ldots, m$. Then, let $\Delta_g = A_{g(n[g])}/B[g]$, $\Delta_{g-1} = A_{(g-1)(n[g-1])}/$ (B[g−1]+B[g]), $\Delta_{g-2}=A_{(g-2)(n[g-2])}$/(B[g−2]+B[g−1]+B[g]), . . . , $\Delta_{i+2}=A_{(i+2)\ (n[i+2])}$/(B[i+2]+B[i+3]+ . . . +B[g]), $\Delta_{i+1}$ is defined by (15) below if $C_i$ is a single-arm tool, where $\Gamma$=(B[i+1]+B[i+2]+ . . . +B[g]).

$$\Delta_{i+1} = \begin{cases} \Phi_{i+1}(S, S) - A_{(i+1)(n[i+1])}, & \text{if } A_{(i+1)(n[i+1])} < \Gamma \times \Phi_{i+1}(S, S)/(\Gamma + 1) \\ \Phi_{i+1}(S, S)/(\Gamma + 1), & \text{if } A_{(i+1)(n[i+1])} \geq \Gamma \times \Phi_{i+1}(S, S)/(\Gamma + 1) \end{cases} \quad (15)$$

If $C_i$ is a dual-arm tool, $\Delta_{i+1}=\Phi_{i+1}(D, S)/(\Gamma+1)$. Then, one has Lemmas 2-3 [Yang, et al., 2014b].

Lemma 2:

For $B_i$ that is composed of two tools, there is an $O^2CS$ and its minimal one-wafer cycle time is $\Theta=\Pi+\Delta$, where $\Delta$ is determined by $$\Delta = \begin{cases} \Phi_2(S, S) - A_{2(n[2])}, & \text{if } A_{2(n[2])} \in [0, (n[2]-1) \times \Phi_2(S, S)/n[2]) \\ & \text{for } S-S \text{ case} \\ \Phi_2(S, S)/n[2], & \text{if } A_{2(n[2])} \in [(n[2]-1) \times \Phi_2(S, S)/n[2], \infty) \\ & \text{for } S-S \text{ case} \\ \Phi_2(D, S)/n[2], & \text{for } D-S \text{ case} \end{cases} \quad (16)$$

With Lemma 2, a method is proposed to find the minimal cycle time and the $O^2CS$ for a $B_i$ composed of two tools in [Yang, et al., 2014b].

Lemma 3:

For a $B_i$ in a treelike hybrid K-cluster tool, if, by the algorithm in [Yang, et al., 2015], a one-wafer cyclic schedule with cycle time $\Theta$ ($\geq\Pi$) is found, a feasible one-wafer cyclic schedule is obtained with cycle time ($\Theta+\Delta$) by setting $\omega_{g((b[g]\_1)-1)}=A_{g((b[g]\_1)}+\Delta$, $g\in[i, m-1]$, and $\omega_{m0}=A_{m0}+\Delta$ where $m\in L$ and $\Delta>0$.

Let $ST_i$ denote a sub-tree in a treelike hybrid K-cluster tool that starts from $C_i$ with $C_i$ being a fork tool. Let $ST_i$ and $ST_j$ be two STs, and $ST_i$ can be contained by $ST_j$, and such a relation is denoted as $ST_i<ST_j$ or $ST_j>ST_i$. In a treelike hybrid K-cluster tool, the individual tools can be numbered such that $ST_j>ST_i$ only if $j<i$. However, $j<i$ does not necessarily mean $ST_j>ST_i$, for they may be independent of each other. Such a relation is denoted as $ST_j \vee ST_i$. Then, one can discuss the one-wafer cyclic scheduling problem. One has the following result.

Theorem 1:

For an $ST_i$ composed of three tools, there is an $O^2CS$ and its minimal cycle time is $\Theta=\Pi+\Delta=\Pi+\max\{\Delta_1, \Delta_2\}$, where $\Delta_1$ and $\Delta_2$ are obtained by the method given in Lemma 2.

Proof:

An $ST_i$ composed of three tools must contain a fork tool denoted by $C_i$ and two downstream tools denoted by $C_{i+1}$ and $C_{i+2}$. It follows from Lemma 2 that one can schedule both $C_i$ and $C_{i+1}$ such that their cycle time is $\Theta=\Pi+\Delta_1$ to obtain an $O^2CS$ for tool pair of $C_i$ and $C_{i+1}$. Similarly, both $C_i$ and $C_{i+2}$ can be scheduled such that their cycle time is $\Theta=\Pi+\Delta_2$ to obtain an $O^2CS$ for tool pair of $C_i$ and $C_{i+2}$. Thus, for $ST_i$ composed of $C_i$, $C_{i+1}$, and $C_{i+2}$, one can schedule the three tools such that their cycle time is $\Theta=\max\{\Pi+\Delta_1, \Pi+\Delta_2\}=\Pi+\max\{\Delta_1, \Delta_2\}$ to obtain an $O^2CS$.

The ST discussed in Theorem 1 is the simplest one. A fork tool $C_i$ with f[i] adjacent downstream tools $C_{i\_1}, C_{i\_2}, \ldots,$ and $C_{i\_f[i]}$ may contain no ST but only branches and these branches are $B_{i\_1}, B_{i\_2}, \ldots, B_{i\_f[i]}$. By the method presented in [Yang, et al., 2014b], one can find $O^2CSs$ for $B_{i\_q}$, $q\in \mathbb{N}_{f[i]}$. Assume that the cycle time for the branch composed of $C_i$ and $B_{i\_q}$ is $\Pi+\Delta_q$. Then, based on Theorem 1, one has the following corollary immediately.

Corollary 1:

For an $ST_i$ composed of $C_i$ and its downstream branches $B_{i\_1}, B_{i\_2}, \ldots, B_{i\_f[i]}$, there is an $O^2CS$ and its minimal one-wafer cycle time is $\Theta=\Pi+\max\{\Delta_1, \Delta_2, \ldots, \Delta_{f[i]}\}$, where $\Pi+\Delta_q$ is the cycle time for the branch composed of $C_i$ and $B_{i\_q}$, $q\in \mathbb{N}_{f[i]}$.

Then, an $O^2CS$ for a treelike hybrid K-cluster tool can be found as follows. Let $C_j$ be a fork tool. There must be a $ST_j$. Assume that there are tools $C_i, C_{i+1}, \ldots, C_{j-2}, C_{j-1}$, and none of them is a fork tool. Then, one calls the multi-cluster tool formed by $C_i$ and all its downstream tools an extended sub-tree denoted as $EST_i$. Note that $C_i$ is not a fork tool. If $EST_i$ contains $ST_j$, one calls $EST_i$ is an extended sub-tree of $ST_j$. Let $F=\{l/C_l \text{ is a fork tool}\}$ be the index set of fork tools. Assume that $j\in F$ has the largest value, i.e. $j=\max_{l\in F}\{l\}$. Then, $ST_j$ must contain no ST and its $O^2CS$ can be found based on Corollary 1. There may be more than one EST of $ST_j$. Thus, with the $O^2CS$ for $ST_j$ found, one needs to find the $O^2CSs$ for all its ESTs. Then, let $F\leftarrow F\setminus\{j\}$. If $F\neq\emptyset$, find h such that it has the largest value in F, i.e., $h=\max_{l\in F}\{l\}$. If $ST_h \vee ST_j$, or they are independent of each other, it can be dealt with just as $ST_j$. Otherwise, $ST_j$ can be contained in $ST_h$ or one has $ST_h>ST_j$. In this case, one needs to find the $O^2CS$ for $ST_h$ and its ESTs. Then, let $F\leftarrow F\setminus\{h\}$ and repeat the above procedure. In this way, with the decreasing order of the indices in F, one finds the $O^2CSs$ for all the STs and their ESTs. When $C_1$ is reached, one finds the $O^2CS$ for the treelike hybrid K-cluster tool. The key is how to find an $O^2CS$ for a ST or an extended one. By the definition of an $EST_k$, if $B_{i\_q}$ in Corollary 1 is replaced by $EST_{i\_q}$, the result must also hold.

In the following, one first shows how to find the $O^2CS$ for an EST that contains only one fork tool and then present a method for finding the $O^2CS$ for the whole system. Assume that $j=\max_{l\in F}\{l\}$ and $EST_i$ is an extended sub-tree of $ST_j$. Further, assume that for tool pair $C_i$ and $C_{i+1}$, $i+1\leq j$, there is no one-wafer cyclic schedule with cycle time $\Theta$. Notice that, based on the $O^2CS$ for $ST_j$ that can be found based on Corollary 1, Condition (13) or (14) is not satisfied for tool pair $C_i$ and $C_{i+1}$, $i+1\leq j$, only.

Let $A_{pj}=\omega_{pj}$, $p\in \mathbb{N}_K\setminus N_i$, $j\in\Omega_{n[p]}$, where $\omega_{pj}$'s are obtained by the algorithm in [Yang, et al., 2015] with cycle time $\Theta$, and define $D[l]=\{PM_{1j}|j\neq n[l] \text{ and } j\neq(b[l]\_d)-1, d\in f[l]\}$ and $B[l]=n[l]-1$, $l\in \mathbb{N}_K$. Let $\Phi_{i+1}(S, S)=4\lambda_{i+1}+3\mu_{i+1}+A_{(i+1)(n[i+1])}-\Theta+4\lambda_i+3\mu_i$ for the S-S case and $\Phi_{i+1}(D, S)=4\lambda_{i+1}+3\mu_{i+1}+A_{(i+1)(n[i+1])}=\Theta+4\lambda_i+3\mu_i$ for the D-S case. It follows from [Yang, et al., 2014b] that, if $A_{(i+1)(n[i+1])}=0$, to make (13) or (14) satisfied for $C_i$ and $C_{i+1}$, $\Theta$ needs to be increased by $\Phi_{i+1}(D, S)$ and $\Phi_{i+1}(S, S)$ time units, respectively. If $A_{(i+1)(n[i+1])}\neq 0$, one needs to check if $A_{j(n[j])}=0$. If yes, the optimal cycle time can still be found by the methods in [Yang, et al., 2014b]. If $A_{j(n[j])}\neq 0$ and there is a dual-arm tool in the tools $C_{i+1}, C_{i+2}, C_j$, or there is at least one $A_{p(n[p])}=0$, $i+1<p<j$, one can still find the optimal cycle time by the methods in [Yang, et al., 2014b]. However, when $A_{p(n[p])}>0$, $i+1\leq p\leq j$, one cannot find the optimal cycle time by the methods in [Yang, et al., 2014b]. In this situation, one discusses how to find the optimal cycle time as follows.

Assume that $C_j$ has f[j] downstream tools such that $ST_j$ has f[j] branches. Then, for $C_{j\_q}$ in $B_{j\_q}$, $q\in \mathbb{N}_{f[j]}$ one first checks whether $A_{(j\_q)(n[q])}>0$. If so, find g such that $A_{(j\_q)+z)(n[(j\_q)+z])}>0$, $0\leq z\leq g$, and $A_{(j\_q)+z+1)(n[(j\_q)+z+1])}>0$ or $C_{(j\_q)+g+1}$ is a dual-arm one, or $(j\_q)+g\in L$. Then, let $A_{(j\_q)+g)}=A_{(j\_g)(n[(j\_q)+g])}/B[(j\_q)+g]$, $\Delta_{(j\_q)+g-1}=$ $A_{(j\_q)+g-1)(n[j\_q)+g-1])}/(B[(j\_q)+g-1]+B[(j\_q)+g])$, $\Delta_{(j\_q)+g-2)}=A_{(j\_q)+g-2)(n[j\_q)+g-2])}/B[(j\_q)+g-2]+B[(j\_q)+g-1]+B[(j\_q)+g])$, ..., and $\Delta_{j\_q}=A_{(j\_q)(n[j\_q])}/B[j\_q]+B[(j\_q)+1]+...+B[(j\_q)+g])$. Further, let $Y_{j\_q}=(B[j\_q]+B[(j\_q)+1]+...+B[(j\_q)+g])$, $q \in \mathbb{N}_{f[j]}$, and $Y_j=Y_{j\_1}+Y_{j\_2}+...+Y_{j\_f[j]}$. It should be noted that, if $A_{(j\_q)(n[j\_q])}=0$, one has $Y_{j\_q}=0$. Then, define $\Delta_j=A_{j(n[j])}/[Y_j+B[j]]$, $\Delta_{j-1}=A_{(j-1)(b[j-1])}/(Y_j+B[j]+B[j-1])$, ..., $\Delta_{i+2}=A_{(i+2)(n[i+2])}/(Y_j+B[j]+B[j-1]+...+B[i+2])$. Let $\Lambda=Y_j+B[j]+B[j-1]+...+B[i+1]$, $\Delta=\min\{\Delta_{i+1}, \Delta_{i+2}, ..., \Delta_j, \Delta_{(j\_q)+z}\}$ and $\kappa=\text{argmin}\{\Delta_{i+1}, \Delta_{i+2}, ..., \Delta_j, \Delta_{(j\_q)+z}\}$ with $q \in \mathbb{N}_{f[j]}$ and $0 \le z \le g$, where $\Delta_{i+1}$ is defined by $$\Delta_{i+1} = \begin{cases} \Phi_{i+1}(S, S) - A_{(i+1)(n[i+1])}, & \text{if } 0 < A_{(i+1)(n[i+1])} < \frac{\Lambda \times \Phi_{i+1}(S, S)}{1+\Lambda} \\ & \text{for } S-S \text{ case} \\ \frac{\Phi_{i+1}(S, S)}{1+\Lambda}, & \text{if } A_{(i+1)(n[i+1])} \ge \frac{\Lambda \times \Phi_{i+1}(S, S)}{1+\Lambda} \\ & \text{for } S-S \text{ case} \\ \frac{\Phi_{i+1}(D, S)}{1+\Lambda}, & \text{for } D-S \text{ case} \end{cases} \quad (17)$$

Then, one has the following results.

Theorem 2:

Assume that: 1) $j=\max_{l \in F}\{1\}$; 2) for an $EST_i$ of $ST_j$, by the algorithm in [Yang, et al., 2015] with cycle time $\Theta$, Condition (14) is violated for tool pair $C_i$ and $C_{i+1}$, $i+1 \le j$, only; and 3) $\Delta=\Delta_\kappa=A_{i+1}$. Then, for $EST_i$, an $O^2CS$ with cycle time $\Theta+\Delta$ can be found, where $\Delta$ is given by (17).

Proof:

Since (14) is violated for tool pair $C_i$ and $C_{i+1}$ only, they should be S-S. It follows from (17) that if $0<A_{(i+1)(n[i+1])} \le \Lambda \times \Phi_{i+1}(S, S)/(\Lambda+1)$ and $\Delta=\Delta_{i+1}=\Phi_{i+1}(S, S)-A_{(i+1)(n[i+1])}$, one has $(\Lambda+1) \times A_{(i+1)(n[i+1])} \le \Lambda \times \Phi_{i+1}(S, S) \Rightarrow A_{(i+1)(n[i+1])} < \Lambda \times (\Phi_{i+1}(S, S)-A_{(i+1)(n[i+1])}) \Rightarrow A_{(i+1)(n[i+1])}/\Lambda < \Phi_{i+1}(S, S)-A_{(i+1)(n[i+1])}=\Delta$. By $A_{(i+1)(n[i+1])} > 0$, one has $\Delta > 0$, or it is feasible in the sense of that the time is set to be positive value. Let $\Theta \leftarrow \Theta+\Delta$. Then, for $B_{(j\_q)+g+1}$ (if it exists) in $B_{j\_q}$ $q \in \mathbb{N}_{f[j]}$, reset the robots' waiting time as given by Lemma 3. Meanwhile, for $C_{(j\_q)+g}$, set $\omega_{(j\_q)+g)l}=A_{(j\_q)+g)l}+A_{(i+1)(n[i+1])}/\Lambda$, $l \in D[(j\_q)+g]$ (or $l \in \mathbb{N}_{n[j\_q)+g]}\setminus\{n[(j\_q)+g]\}$ if $(j\_q)+g \in L$), $\omega_{(j\_q)+g)(b[(j\_q)+g]\_1)-1)}=A_{(j\_q)+g)(b[(j\_q)+g]\_1)-1)}+\Delta$ (or $\omega_{(j\_q)+g)0}=A_{(j\_q)+g)0}+\Delta$ if $(j\_q)+g \in L$), and $\omega_{(j\_q)+g)(n[j\_q)+g])}=A_{(j\_q)+g)(n[j\_q)+g])}-B[(j\_q)+g] \times A_{(i+1)(n[i+1])}/\Lambda > A_{(j\_q)+g)(n[j\_q)+g])}-B[(j\_q)+g] \times \Delta > A_{(j\_q)+g)(n[(j\_q)+g])}-B[(j\_q)+g] \times \Delta_{(j\_q)+g}=0$. It follows from the discussion in the last section that it is feasible for $C_{(j\_q)+g}$. For $C_{(j\_q)+g-1}$, set $\omega_{(j\_q)+g-1)(b[(j\_q)+g-1]\_1)-1)}=A_{(j\_q)+g-1)(b[(j\_q)+g-1]\_1)-1)}+B[(j\_q)+g] \times A_{(i+1)(n[i+1])}/\Lambda+\Delta$, $\omega_{(j\_q)+g-1)l}=A_{(j\_q)+g-1)l}+A_{(i+1)(n[i+1])}/\Lambda$, $l \in D[(j\_q)+g-1]$, and $\omega_{(j\_q)+g-1)(n[(j\_q)+g-1])}=A_{(j\_q)+g-1)(n[(j\_q)+g-1])}-(B[(j\_q)+g]+B[(j\_q)+g-1]) \times A_{(i+1)(n[i+1])}/\Lambda > 0$. It is also feasible for $C_{(j\_q)+g-1}$. Then, set the robot waiting time for $C_{(j\_q)+g-2}, ..., C_{(j\_q)+2}, C_{(j\_q)+1}$, and $C_{j\_q}$ in a similar way. For $C_{j\_q}$, one has $\omega_{(j\_q)(b[j\_q]\_1)-1)}=A_{(j\_q)(b[j\_q]\_1)-1)}+(B[(j\_q)+g]+B[(j\_q)+g-1]+...+B[(j\_q)+1]) \times A_{(i+1)(n[i+1])}/\Lambda+\Delta$, $\omega_{(j\_q)l}=A_{(j\_q)l}+A_{(i+1)(n[i+1])}/\Lambda$, $l \in D[j\_q]$, and $\omega_{(j\_q)(n[j\_q])}=A_{(j\_q)(n[j\_q])}-(B[(j\_q)+g]+B[(j\_q)+g-1]+...+B[j\_q]) \times A_{(i+1)(n[i+1])}/\Lambda > 0$. It is feasible for $C_{j\_q}$ too. For the fork tool $C_j$, set $\omega_{j((b[j]\_d)-1)}=A_{j((b[j]\_d)-1)}+(B[(j\_q)+g]+B[(j\_q)+g-1]+...+B[j\_q]+1]) \times A_{(i+1)(n[i+1])}/\Lambda$, $d \in \{2, 3, ..., f[j]\}$; $\omega_{j((b[j]\_1)-1)}=A_{j((b[j]\_1)-1)}+(B[(j\_q)+g]+B[(j\_q)+g-1]+...+B[j\_q]) \times A_{(i+1)(n[i+1])}/\Lambda+\Delta$; and $\omega_{jl}=A_{jl}+A_{(i+1)(n[i+1])}/\Lambda$, $l \in D[j]$. At last, set $\omega_{j(n[j])}=A_{j(n[j])}-(Y_j+B[j]) \times A_{(i+1)(n[i+1])}/\Lambda > 0$. Similarly, set the robot waiting time for $C_{j-1}, C_{j-2}, ...,$ till to $C_{i+1}$. In this way, for $C_{i+1}$, one has $\omega_{(i+1)((b[i+1]\_1)-1)}=A_{(i+1)((b[i+1]\_1)-1)}+(\Lambda-B[i+1]) \times A_{(i+1)(n[i+1])}/\Lambda+\Delta$, $\omega_{(i+1)l}=A_{(i+1)l}+A_{(i+1)(n[i+1])}/\Lambda$, $j \in D[i+1]$, and $\omega_{(i+1)(n[i+1])}=A_{(i+1)(n[i+1])}-\Lambda \times \Delta_{(i+1)(n[i+1])}/\Lambda=0$. By doing so, one has $\Theta+\Delta-(4\lambda_{i+1}+3\mu_{i+1})=\Theta+4\lambda_{i+1}+3\mu_{i+1}+A_{(i+1)(n[i+1])}-\Theta+4\lambda_i+3\mu_i)-A_{(i+1)(n[i+1])}-(4\lambda_{i+1}+3\mu_{i+1})=4\lambda_i+3\mu_i$. This implies that a one-wafer cyclic schedule is found for $EST_i$ with cycle time $\Theta \leftarrow \Theta+\Delta$. Notice that one has $\Theta+\Delta-(4\lambda_{i+1}+3\mu_{i+1})=4\lambda_i+3\mu_i$, implying that any decrease of cycle time $\Theta$ would result in $\Theta+\Delta-(4\lambda_{i+1}+3\mu_{i+1})<4\lambda_i+3\mu_i$, or the schedule obtained is optimal in the sense of cycle time.

If $A_{(i+1)(n[i+1])} \ge \Lambda \times \Omega_{i+1}(S, S)/(\Lambda+1)$ and $\Delta=\Phi_{i+1}(S, S)/(\Lambda+1)>0$. Let $\Theta \leftarrow \Theta+\Delta$, and set the robot waiting time as done above with both $A_{(i+1)(n[i+1])}/\Lambda$ and $\Delta=\Phi_{i+1}(S, S)-A_{(i+1)(n[i+1])}$ being replaced by $\Delta=\Phi_{i+1}(S, S)/(\Lambda+1)$. Eventually, for $C_{i+1}$, one has $\omega_{(i+1)((b[i+1]\_1)-1)}=A_{(i+1)((b[i+1]\_1)-1)}+(\Lambda-B[i+1]) \times \Delta+\Delta$, $\omega_{(i+1)l}=A_{(i+1)l}+\Delta$, $l \in D[i+1]$, and $\omega_{(i+1)(n[i+1])}=A_{(i+1)(n[i+1])}-\Lambda \times \Delta \ge 0$. Similar to the above case, the obtained schedule can be shown to be a feasible and optimal one-wafer cyclic schedule.

Figure 5:
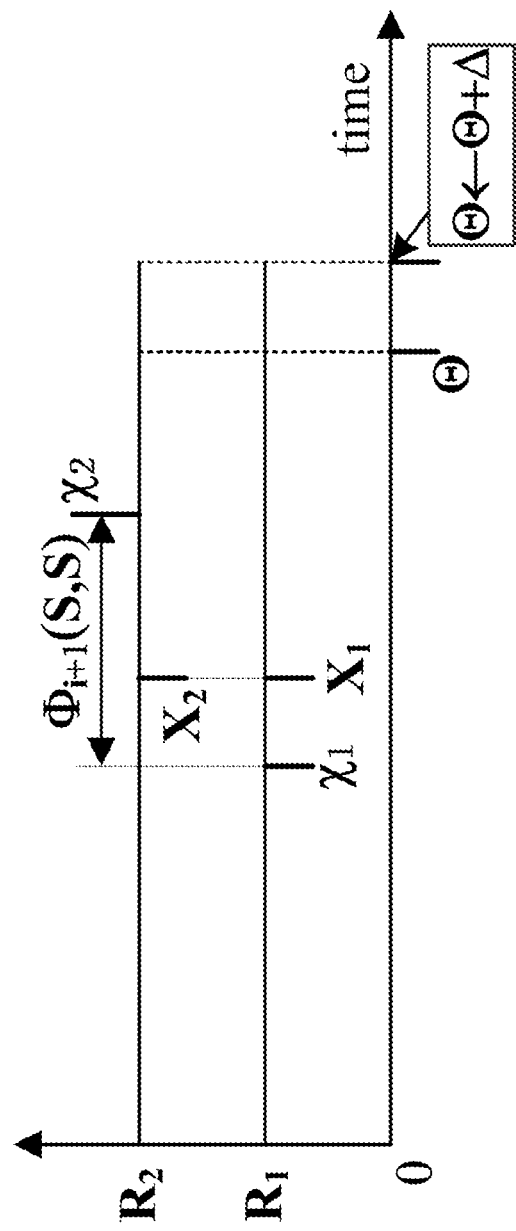
FIG. 5 provides an illustration of the proof of Theorem 2.

The result given by Theorem 2 can be illustrated by FIG. 5. At time zero, $R_i$ in $C_i$ completes its firing for loading a wafer into $p_{i(b[i])}(p_{(i+1)0})$. Meanwhile, $R_{i+1}$ in $C_{i+1}$ starts to unload a wafer from $p_{i(b[i])}(p_{(i+1)0})$. As shown in FIG. 5, $\chi_1=\Theta-(4\lambda_i+3\mu_i)$ is the time point when $R_i$ is scheduled to unload a wafer from $p_{i(b[i])}(p_{(i+1)0})$ and $\chi_2=4\lambda_{i+1}3\mu_{i+1}+A_{(i+1)(n[i+1])}$ is the time point when $R_{i+1}$ is scheduled to load a wafer into $p_{i(b[i])}(p_{(i+1)0})$. With $\chi_1<\chi_2$, the schedule for $C_i$ is unrealizable. Let $\Phi_{i+1}(S, S)=\chi_2-\chi_1$. Then, by Theorem 2, the cycle time is increased by $\Delta$ such that $\Theta \leftarrow \Theta+\Delta$, with $\Delta=\Delta_{i+1}$ being given by (17). From (17), with $C_i$ and $C_{i+1}$ being S-S, there are two cases. For Case 1, $A_{(i+1)(n[i+1])} \le \Lambda \times \Phi_{i+1}(S, S)/(\Lambda+1)$, and $\Delta=\Delta_{i+1}=\Omega_{i+1}(S, S)-A_{(i+1)(n[i+1])}$. Then, with cycle time $\Theta$, $X_1=\chi_1+\Delta$ is the time point when $R_i$ is scheduled to unload a wafer from $p_{i(b[i])}(p_{(i+1)0})$ and $X_2=\chi_2-A_{(i+1)(n[i+1])}$ is the time point when $R_{i+1}$ is scheduled to load a wafer into $p_{i(b[i])}(p_{(i+1)0})$. Since $X_1=X_2$ as illustrated in FIG. 5, the schedules for both $C_i$ and $C_{i+1}$ are realizable and a one-wafer cyclic schedule is obtained for $EST_i$. For Case 2, $A_{(i+1)(n[i+1])} \ge \Lambda \times \Phi_{i+1}(S, S)/(\Lambda+1)$, and $\Delta=\Phi_{i+1}(S, S)/(\Lambda+1)$. Then, with cycle time $\Theta$, one has $X_1=\chi_1+\Delta=X_2=\chi_2-\Phi_{i+1}(S, S)+\Delta$. Hence, a one-wafer cyclic schedule is obtained for $EST_i$ too.

If $C_i$ and $C_{i+1}$ are D-S, one has the following result.

Theorem 3:

Assume that: 1) $j=\max_{l \in F}\{1\}$; 2) for an $EST_i$ of $ST_j$, by the algorithm in [Yang, et al., 2015] with cycle time $\Theta$, Condition (13) is violated for adjacent tool pair $C_i$ and $C_{i+1}$, $i+1 \le j$, only; and 3) $\Delta=\Delta_\kappa=A_{i+1}$. Then, for $EST_i$, an $O^2CS$ with cycle time $\Theta+\Delta$ can be found, where $\Delta$ is given by (17).

Proof:

Since (13) is violated for adjacent tool pair $C_i$ and $C_{i+1}$ only, it should be D-S. It follows from (17) that $\Delta=\Omega_{i+1}(D, S)/(\Lambda+1)>0$. Let $\Theta \leftarrow \Theta+\Delta$, and set the robot waiting time as done for Case 1 in Theorem 2 with both $A_{(i+1)(n[i+1])}/\Lambda$ and $\Delta=\Phi_{i+1}(S, S)-A_{(i+1)(n[i+1])}$ being replaced by $\Delta=\Phi_{i+1}(S, S)/(\Lambda+1)>0$. At last, for $C_{i+1}$, set $\omega_{(i+1)((b[i+1]\_1)-1)}=A_{(i+1)((b[i+1]\_1)-1)}+(\Lambda-B[i+1]) \times \Delta+\Delta$, $\omega_{(i+1)l}=A_{(i+1)l}+\Delta$, $l \in D[i+1]$, and $\omega_{(i+1)(n[i+1])}=A_{(i+1)(n[i+1])}-\Lambda \times \Delta=A_{(i+1)(n[i+1])}-\Lambda \times $\Phi_{i+1}(D, S)/(\Lambda+1)$. By the assumption in Section A, for each tool $C_p$, $p \in \mathbb{N}_K$, $n[p] \geq 2$ holds. Hence, for single-arm tool $C_{i+1}$, one has $\Theta = \psi_i = \sum_{l=0}^{n[i+1]} A_{(i+1)l} + 2(n[i+1]+1)(\lambda_{i+1} + \mu_{i+1}) \geq \sum_{l=0}^{n[i+1]} A_{(i+1)l} + 6(\lambda_{i+1} + \mu_{i+1}) \Rightarrow 6(\lambda_{i+1}) \leq \Theta \Rightarrow 4\lambda_{i+1} + 3\mu_{i+1} < 4(\lambda_{i+1} + \mu_{i+1}) \leq (2/3)\Theta$. For dual-arm tool $C_i$, one has $\Theta = \psi_i = \sum_{l=0}^{n[i]} A_{kl} + (n[i]+1)(\lambda_i + \mu_i) \geq \sum_{l=0}^{n[i]} A_{kl} + 3(\lambda_i + \mu_i) \Rightarrow 3\lambda_i < \Theta \Rightarrow 2\Theta < 3\Theta - 3\lambda_i \Rightarrow (2/3)\Theta < \Theta - \lambda_i$. Thus, one has $4\lambda_{i+1} + 3\mu_{i+1} < (2/3)\Theta < \Theta - \lambda_i \Rightarrow 4\lambda_{i+1} + 3\mu_{i+1} - (\Theta - \lambda_i) + A_{(i+1)(n[i+1])} < A_{(i+1)(n[i+1])} \Rightarrow A_{(i+1)(n[i+1])} > \Phi_{i+1}(D, S) = 4\lambda_{i+1} + 3\mu_{i+1} - (\Theta - \lambda_i) + A_{(i+1)(n[i+1])}$. This implies that $\omega_{(i+1)(n[i+1])} = A_{(i+1)(n[i+1])} - \Lambda \times \Phi_{i+1}(D, S)/(\Lambda+1) > 0$, i.e. it is feasible. Similar to Theorem 2, the schedule obtained is optimal.

The idea of Theorem 3 is the same as that of Theorem 2. In Theorems 2 and 3, it is assumed that $\kappa = i+1$. When $\kappa = \arg\min\{\Delta_{i+1}, \Delta_{i+2}, \ldots, \Delta_j, \Delta_{(j\_q)+z}\} \neq i+1$, $q \in \mathbb{N}_{f[j]}$, $0 \leq z \leq g$, the following result presents how to find an $O^2CS$ for $EST_i$.

Theorem 4:

Assume that: 1) $j = \max_{l \in F}\{l\}$; 2) in $EST_i$ of $ST_j$, by the algorithm in [Yang, et al., 2015] with cycle time $\Theta$, Condition (13) or (14) is violated for tool pair $C_i$ and $C_{i+1}$, $i+1 \leq j$, only; 3) $\Delta = \Delta_\kappa \neq \Delta_{i+1}$. Then, there is an $O^2CS$ with cycle time $\Theta + \Delta$ for $EST_i$, where $\Delta$ is defined as above.

Proof:

Assume $\kappa = p$, or $\Delta = \min\{\Delta_{i+1}, \Delta_{i+2}, \ldots, \Delta_j, \Delta_{(j\_q)+z}\} = \Delta_p$, $q \in \mathbb{N}_{f[j]}$, $0 \leq z \leq g$, and $p \in [j\_1, (j\_1)+g]$. Let $\Theta \leftarrow \Theta + \Delta$ and, for $EST_i$, set the robots' waiting time as done for Case 1 in Theorem 2 with both $A_{(i+1)(n[i+1])}/\Lambda$ and $\Delta = \Phi_{i+1}(S, S) - A_{(i+1)(n[i+1])}$ being replaced by $\Delta = \Delta_p$ such that $\omega_{p(n[p])} = A_{p(n[p])} - (B[p] + B[p+1] + \ldots + B[g]) \times (A_{p(n[p])}/(B[p] + B[p+1] + \ldots + B[g])) = 0$. Then let $g = p-1$ and calculate $\Delta$ again. If $\Delta = \Delta_q$, $q \in [j\_1, (j\_q)+g]$, let $\Theta \leftarrow \Theta + \Delta$ and repeat the above process. If $p \in [j\_q, (j\_q)+g]$, $q = 2, 3, \ldots, f[j]$, or $p \in \arg\min\{\Delta_{i+1}, A_{i+2}, \ldots, \Delta_j\}$, set the robots' waiting time for $EST_i$ in the same way. In this way, finally, $\Delta = A_{i+1}$ must occur and then an $O^2CS$ for $EST_i$ is found by using Theorem 2 (or Theorem 3 when $C_i$ is a dual-arm one).

By Theorems 2-4, to find an $O^2CS$ for an $EST_i$ of $ST_j$, it requires that $j$ is the largest one in $F$, and such an $EST_i$ contains only one fork tool. This is not enough for one to find the $O^2CS$ for a treelike hybrid K-cluster tool. However, based on Theorems 2-4, one can obtain the $O^2CS$ for an arbitrary $EST_k$ as follows. Assume that for an $EST_k$ that may contain more than one fork tool. Then Condition (13) or (14) is violated for $C_k$ and $C_i$ only with $C_i$ being the downstream adjacent tool of $C_k$. A path from $C_k$ to a downstream $C_i$ is called a shortest path if there are the fewest nodes (tools) on the path. Then, for an $EST_k$, one says that $C_i$ is "connected" to $C_k$ if: 1) there are only single-arm tools on the shortest path from $C_k$ to $C_i$; and 2) for each tool $C_p$ on the path, $\omega_{p(n[p])}$'s $> 0$. By default, $C_k$ is connected to itself. Let $S_k = \{p | C_p \text{ is connected to } C_k\}$. Further, as is done above, let $\Phi_i(S, S) = 4\lambda_i + 3\mu_i + A_{i(n[i])} - \Theta + 4\lambda_k + 3\mu_k$ for the S-S case and $\Phi_i(D, S) = 4\lambda_i + 3\mu_i + A_{i(n[i])} - \Theta + \lambda_k$ (for the D-S case). Then, for an arbitrary $EST_k$ with $C_i$ being the downstream adjacent tool of $C_k$, to find the minimal one-wafer cycle time, $\Delta_m$ can be calculated as follows. One has that $$\Delta_m = A_{m(n[m])}/(\Sigma_{p \in S_m} B[p]), m > i, \quad (18)$$

and if $m = i$, then one has $$\Delta_i = \begin{cases} \Phi_i(S, S) - A_{i(n[i])}, & \text{if } 0 < A_{i(n[i])} \leq \dfrac{\sum_{p \in S_i} B[p] \times \Phi_i(S, S)}{1 + \sum_{p \in S_i} B[p]} \\ & \text{for } S-S \text{ case} \\ \dfrac{\Phi_i(S, S)}{1 + \sum_{p \in S_i} B[p]}, & \text{if } A_{(i+1)(n[i+1])} \geq \dfrac{\sum_{p \in S_i} B[p] \times \Phi_i(S, S)}{1 + \sum_{p \in S_i} B[p]} \\ & \text{for } S-S \text{ case} \\ \dfrac{\Phi_i(D, S)}{1 + \sum_{p \in S_i} B[p]}, & \text{for } D-S \text{ case} \end{cases} \quad (19)$$

Clearly, (19) is the extension of (17) for an $EST_k$ containing one or more fork tools. Thus, based on (18) and (19), one can find the $O^2CS$ for an $EST_k$ if (13) or (14) is violated for $C_k$ and $C_i$ only with $C_i$ being the downstream adjacent tool of $C_k$. With the $O^2CS$ for an $EST_j$, the $O^2CS$ for a $ST_k$ that contains a number of $EST_j$'s can be obtained by using Corollary 1. One presents the following algorithm.

Algorithm 1:

Given an $O^2CS$ with cycle time $\Theta$ for $EST_i$ (or $ST_i$, or $B_i$), find the $O^2CS$ for $EST_k$ (or $ST_k$) with $C_i$ being the downstream adjacent tool of $C_k$.

Step 1:

Given cycle time $\Theta$, check if $\Theta$ is the optimal cycle time for $EST_k$ (or $ST_k$) by the algorithm in [Yang, et al., 2015]. If yes, go to Step 5.

Step 2:

If $k \notin F$ and $A_{i(n[i])} = 0$, then:

2.1. $\Theta \leftarrow \Theta + \Delta_i = \Theta + \Phi_i(S, S)$ (or $\Phi_i(D, S)$ if it is D-S case);

2.2. Reset the robots' waiting time by the algorithm in [Yang, et al., 2015] with cycle time $\Theta$, then go to Step 5.

Step 3:

If $k \notin F$ and $A_{i(n[i])} \neq 0$, then:

3.1. For $m \in S_i$, calculate $\Delta_m$'s, by (18) or (19).

3.2. If $\Delta = \min\{\Delta_p | p \in S_i\} = \Delta_i$, do:

3.2.1. If it belongs to the first case in (19), then:

3.2.1.1. In $EST_i$ or $B_i$, for $p \notin S_i$, if $p \notin L$, $\omega_{p((b[p]\_1)-1)} = A_{p((b[p]\_1)-1)} + \Delta$, otherwise $\omega_{p0} = A_{p0} + \Delta$.

3.2.1.2. In $EST_i$ or $B_i$, if $p \in S_i$ and $p \notin F$, set $\omega_{pj} = A_{pj} + A_{i(n[i])}/(\Sigma_{p \in S_i} B[p])$, $j \in D[p]$ (or $j \in \mathbb{N}_{n[p]} \setminus \{n[p]\}$ if $p \in L$), $\omega_{p((b[p]\_1)-1)} = A_{p((b[p]\_1)-1)} + \Sigma_{q \in S_p\{p\}} B[q] \times A_{i(n[i])}/(\Sigma_{p \in S_i} B[p]) + \Delta$ (or $\omega_{p0} = A_{p0} + \Delta$ if $p \in L$), and $\omega_{p(n[p])} = A_{p(n[p])} - \Sigma_{q \in S_p} B[q] \times A_{i(n[i])}/(\Sigma_{p \in S_i} B[p])$.

3.2.1.3. In $EST_i$, if $p \in S_1$ and $p \in F$, set $\omega_{pj} = A_{pj} + A_{i(n[i])}/(\Sigma_{p \in S_i} B[p])$, $j \in D[p]$, $\omega_{p((b[p]\_1)-1)} = A_{p((b[p]\_1)-1)} +$ $$\omega_{pj} = A_{pj} + A_{i(n[i])}\Big/\Big(\sum_{p \in S_i} B[p]\Big), j \in D[p],$$

$$\omega_{p((b[p]\_1)-1)} = A_{p((b[p]\_1)-1)} + \sum_{q \in S_{p\_1}} B[q] \times A_{i(n[i])}\Big/\Big(\sum_{p \in S_i} B[p]\Big) + \Delta,$$

$$\omega_{p((b[p]\_d)-1)} = A_{p((b[p]\_d)-1)} + \Big(\sum_{q \in S_{p\_d}} B[q] + 1\Big) \times A_{i(n[i])}\Big/\Big(\sum_{p \in S_i} B[p]\Big),$$

$$d \in \{2, 3, \ldots, f[p]\},$$

and $\omega_{p(n[p])} = A_{p(n[p])} - \sum_{q \in S_p} B[q] \times A_{i(n[i])}\Big/\Big(\sum_{p \in S_i} B[p]\Big).$ 3.2.1.4. Go to Step 5.

3.2.2. If it belongs to the second/third case in (19), set the robot waiting time by repeating Steps 3.2.1.1-3.2.1.4, in doing so, one needs to replace $A_{i(n[i])}/(\Sigma_{p\in S_i}B[p])$ and $\Delta=\Phi_i(S,S)-A_{i(n[i])}$ there with $\Delta=\Phi_i(S,S)/(\Sigma_{p\in S_i}B[p]+1)$ (or $\Phi_i(D,S)/(\Sigma_{p\in S_i}B[p]+1)$ if it belongs to the third case).

3.3. If $\Delta=\min\{\Delta_p | p \in S_i\}=\Delta_f \neq \Delta_i$, set the robot waiting time by repeating Procedures in 3.2.1.1 to 3.2.1.4 with both $A_{i(n[i])}/(\Sigma_{p\in S_i}B[p])$ and $\Delta=\Phi_i(S,S)-A_{i(n[i])})$ being replaced by $\Delta=\Delta_f$, then, back to Step 3.1.

Step 4: If k∈F, then:

4.1. Find the optimal cycle time $\Theta+\Delta_q$ for $C_k$ with $EST_{k\_q}$ (or $ST_{k\_q}$), $q\in \mathbb{N}_{f[k]}$, by repeating Steps 2 and 3.

4.2. $\Theta\leftarrow\Theta+\max\{\Delta_1, \Delta_2, \ldots, \Delta_{f[k]}\}$.

4.3. Find the O²CS for $ST_k$ by resetting the robot waiting time with cycle time $\Theta$ by using the algorithm in [Yang, et al., 2015].

Step 5:

Stop and output the schedule.

With the above analysis, one can find the O²CS for a process-dominant treelike hybrid K-cluster tool as follows. One finds the O²CS for the smallest ST, say $ST_j$, with $j=\max_{l\in F}\{l\}$ and its ESTs first. Then, do that for the ST that is larger than $ST_j$. Continue this process until it is done for the K-cluster tool to find the final solution. However, by Algorithm 1, it requires that, for an $EST_k$, Condition (13) or (14) is violated for tool pair $C_k$ and $C_i$ only. This may not hold for general cases. To solve this problem, the O²CS for the ESTs of $ST_j$ can be found as follows. Based on the O²CS of $ST_j$, for $EST_{j-1}$ with $C_{j-1}$ being not a fork, the above requirement must be satisfied. Thus, one can find the O²CS for $EST_{j-1}$. Thereafter, one can do that for $EST_{j-2}$, until to $EST_i$ such that the upstream adjacent tool of $C_i$ is a fork, and in these processes the above requirement is always satisfied. Thus, one presents the following algorithm.

Algorithm 2:

Find an O²CS for a process-dominant treelike hybrid K-cluster tool.

Step 1:

$\Theta=\max\{\Pi_1, \Pi_2, \ldots, \Pi_K\}$.

Step 2:

Check the existence of an OSLB by the algorithm in [Yang et al., 2015]. Then:

2.1. If yes, find the schedule and go to Step 4.

2.2. Otherwise find the set F such that 1∈F, find the fork tool $C_j$ with $j=\max_{l\in F}\{l\}$, and go to Step 3.

Step 3:

Find the O²CSs for $ST_j$ and all of its $EST_k$'s:

3.1. Find the O²CS for $ST_j$.

3.2. Find the O²CS for all of the $EST_k$'s of $ST_j$:

3.2.1. Find k such that $C_k$ is the upstream adjacent tool of $C_j$.

3.2.2. If $C_k$ is a fork tool, go to Step 3.3; otherwise proceed to execute Step 3.2.3.

3.2.3. Find the O²CS for $EST_k$ by using Algorithm 1.

3.2.4. Let i=k, if i=1, go to Step 4; otherwise find k such that $C_k$ is the upstream adjacent tool of $C_i$, and go to Step 3.2.2.

3.3. If $F\leftarrow F\setminus\{j\}\neq\emptyset$, go back to Step 2.2.

Step 4:

End and output the schedule.

Notice that, for a process-dominant treelike hybrid K-cluster tool, the number of Bs+the number of STs+the number of ESTs must be less than K. Also, any B or ST, or EST contains no more than K tools. Given any of B, ST, and EST, one needs to calculate the optimal cycle time at most (K−1) times by increasing Δ each time. Thus, the computational complexity is $O(K^2)$. With K being limited in practice, the method presented is efficient and is applicable to industrial cases.

D. Illustrative Examples

This section uses two examples to show the application of the disclosed method.

Example 1

It is a treelike hybrid 3-cluster tool, where $C_1$ is a fork tool and its adjacent downstream tools are $C_2$ and $C_3$. Furthermore, $C_2$ and $C_3$ are single-arm tools, and $C_1$ is a dual-arm tool. Their activity times are as follows. For $C_1$, $(\alpha_{10}, \alpha_{11}, \alpha_{12}, \alpha_{13}, \lambda_1, \mu_1)=(0, 77, 0, 0, 23, 1)$; for $C_2$, $(\alpha_{20}, \alpha_{21}, \alpha_{22}, \lambda_2, \mu_2)=(0, 75, 79, 4, 1)$; and for $C_3$, $(\alpha_{30}, \alpha_{31}, \alpha_{32}, \lambda_3, \mu_3)=(0, 71, 69, 6, 1)$.

For $C_1$, one has $\xi_{10}=23$ s, $\xi_{11}=100$ s, $\xi_{12}=23$ s, $\xi_{13}=23$ s, $\psi_{11}=(n[1]+1)\times(\lambda_1+\mu_1)=4\times24=96$ s, and $\Pi_1=100$ s. For $C_2$, one has $\xi_{20}=19$ s, $\xi_{21}=94$ s, $\xi_{22}=98$ s, $\psi_{21}=2(n[2]+1)\times(\lambda_2+\mu_2)=6\times5=30$ s and $\Pi_2=98$ s. For $C_3$, one has $\xi_{30}=27$ s, $\xi_{31}=98$ s, $\xi_{32}=96$ s, $\psi_{31}=2(n[3]+1)\times(\lambda_3+\mu_3)=6\times7=42$ s and $\Pi_3=98$ s. Since all the individual tools are process-bound, this 3-cluster tool is process-dominant, and one lets $\Theta=\pi_1=\pi_2=\pi_3=\Pi=\Pi_1=100$ s. By the algorithm provided in [Yang, et al., 2015], the robots' waiting time is set as $\omega_{20}=6$ s, $\omega_{21}=2$ s, and $\omega_{22}=\Pi-\psi_{21}-\omega_{20}-\omega_{21}=100-30-6-2=62$ s; $\omega_{30}=2$ s, $\omega_{31}=4$ s, and $\omega_{32}=\Pi-\psi_{31}-\omega_{30}-\omega_{31}=100-42-2-4=52$ s. Thus, for $C_1$, as $\Pi-(4\lambda_2+3\mu_2+\omega_{22})-\lambda_1=100-(19+62)-23=-4<0$ and $\Pi-(4\lambda_3+3\mu_3+\omega_{32})-\lambda_1=100-(27+52)-23=-2<0$, or (14) is violated and there is no OSLB. Thus one needs to find an optimal cycle time $\Theta$ by Algorithm 2.

Figure 6:
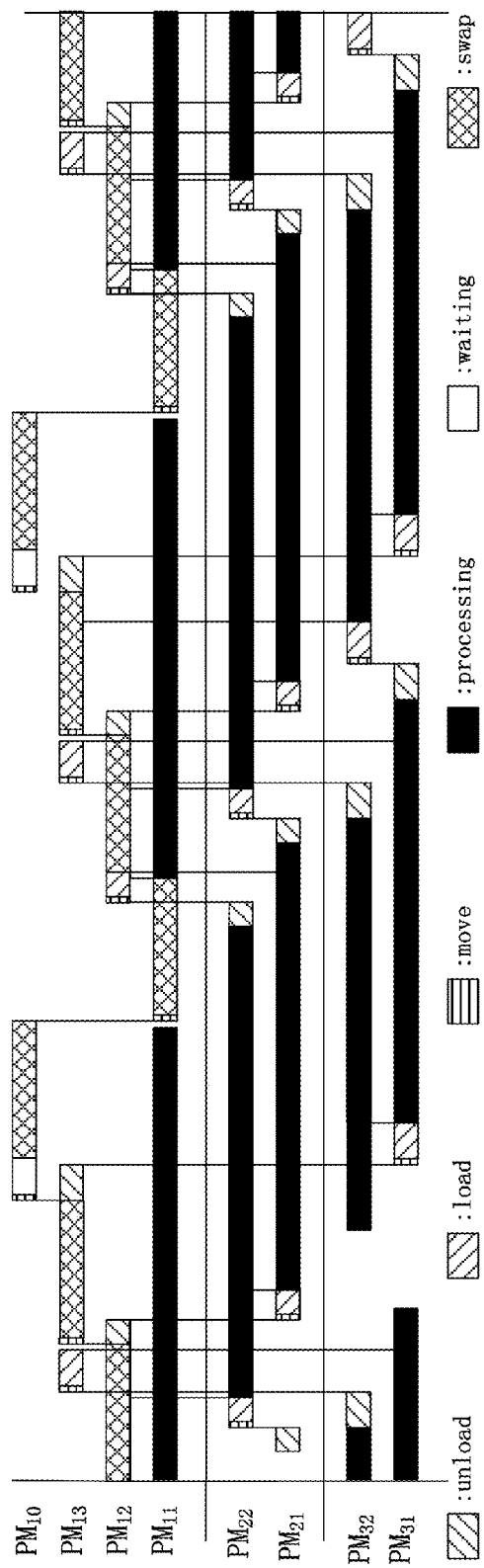
FIG. 6 depicts a Gantt chart for the optimal schedule of Example 1.

By Algorithm 2, one has $\Delta_2=\Phi_2(D,S)/n[2]=4/2=2$ s, $\Delta_3=\Phi_3(D,S)/n[3]=2/2=1$ s, $\Delta=\max\{\Delta_2, \Delta_3\}=2$ s, and $\Theta=102$ s. Then, let $A_{ij}=\omega_{ij}$, $i\in \mathbb{N}_3\setminus\{1\}$ and $j\in\Omega_{i(n[i])}$, where $\omega_{ij}$ is obtained by the algorithm provided in [Yang, et al., 2015]. By Algorithm 2, the robot waiting time is set as $\omega_{30}=A_{30}+\Delta=4$ s, $\omega_{31}=A_{31}+\Delta=6$ s, $\omega_{32}=A_{32}-\Delta=50$ s, $\omega_{20}=A_{20}+\Delta=8$ s, $\omega_{21}=A_{21}+\Delta=4$ s, $\omega_{22}=A_{22}-\Delta=60$ s, $\omega_{10}=A_{10}+\Delta=6$ s, and $\omega_{11}=\omega_{12}=\omega_{13}=0$. In this way, the minimal cycle time and optimal one-wafer cyclic schedule is obtained and it is shown by the Gantt chart in FIG. 6.

Example 2

It is from [Yang, et al., 2015]. A treelike hybrid 5-cluster tool with $C_2$ be a fork tool, and its adjacent downstream tools are $C_3$ and $C_5$. The tool $C_4$ is the downstream tool of $C_3$, and $C_2$ is the downstream tool of $C_1$. Furthermore, $C_1$ is a dual-arm tool and the others are single-arm tools. Their activity time is as follows: for $C_1$, one has $(\alpha_{10}, \alpha_{11}, \lambda_1, \mu_1)=(0, 61.5, 0, 28.5, 0.5)$; for $C_2$, one has $(\alpha_{20}, \alpha_{21}, \alpha_{22}, \lambda_2, \mu_2)=(0, 0, 0, 10, 1)$; for $C_3$, one has $(\alpha_{30}, \alpha_{31}, \alpha_{32}, \alpha_{33}, \lambda_3, \mu_3)=(0, 56, 0, 58, 7, 1)$; for $C_4$, one has $(\alpha_{40}, \alpha_{41}, \alpha_{42}, \alpha_{43}, \lambda_4, \mu_4)=(0, 56, 66, 65, 5, 1)$; and for $C_5$, one has $(\alpha_{50}, \alpha_{51}, \alpha_{52}, \lambda_5, \mu_5)=(0, 48, 50, 6, 1)$.

From [Yang, et al., 2015], the lower bound of cycle time of the system is $\Theta=\Pi=90$ s. With $\Theta=\Pi=90$ s, the robot waiting time is set as follows. For $C_4$, $\omega_{40}=11$ s, $\omega_{41}=1$ s, $\omega_{42}=2$ s, and $\omega_{43}=28$ s are set. For $C_5$, $\omega_{50}=15$ s, $\omega_{51}=13$ s, and $\omega_{52}=20$ s are set. For $C_3$, $\omega_{31}=8$ s, $\omega_{30}=3$ s, $\omega_{32}=1$ s, and $\omega_{33}=14$ s are set. For $C_2$, $\omega_{20}=2$ s, $\omega_{21}=0$, and $\omega_{22}=22$ s are set. Then, for $C_1$, one has $\Pi-(4\lambda_2+3\mu_2+\omega_{22})-\lambda_1=90-(43+22)-28.5=-3.5<0$, or there is no OSLB. Therefore, one needs to find the minimal cycle time $\Theta$ by Algorithm 2.

Figure 7:
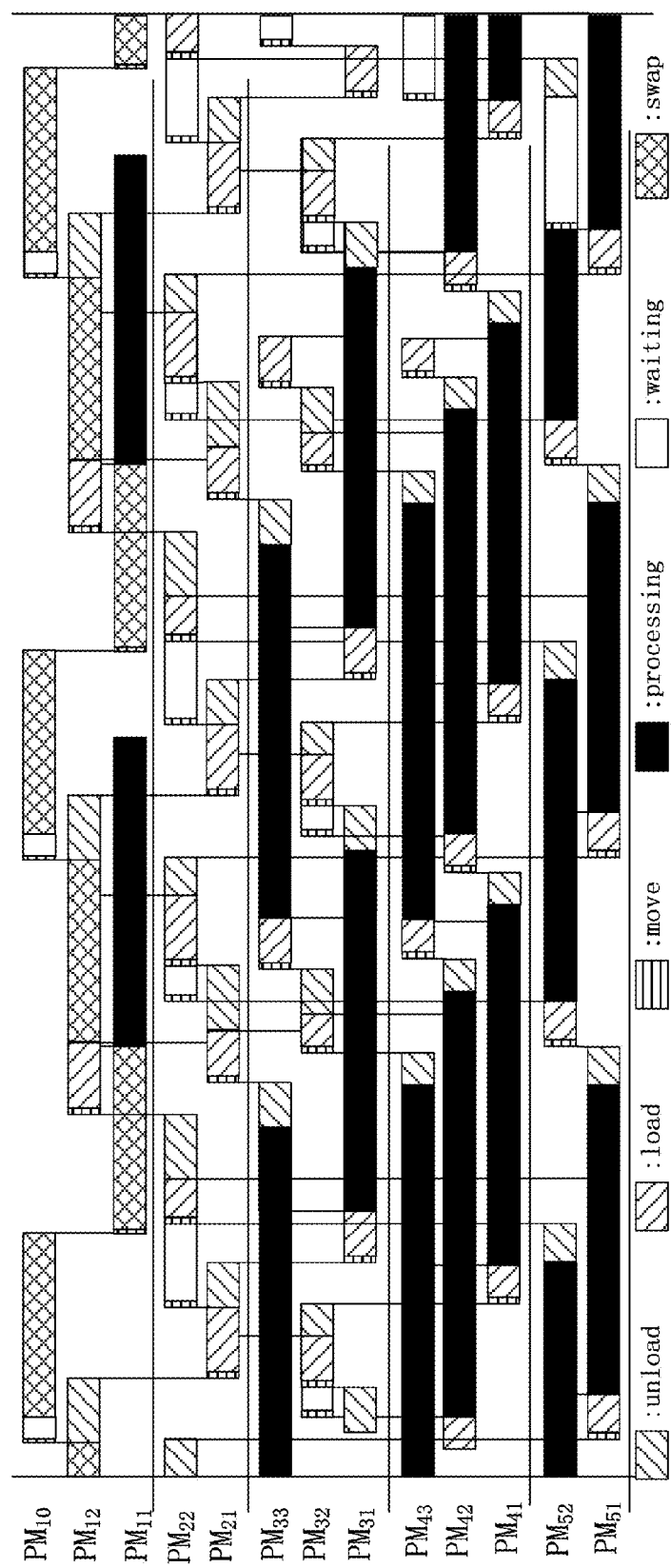
FIG. 7 depicts a Gantt chart for the optimal schedule of Example 2.

With $\omega_{22}=22>0$, $\omega_{52}=20>0$, $\omega_{33}=14>0$, and $\omega_{43}=28>0$, one has $\Sigma_{p \in S_2}B[p]=(B[2]+B[3]+B[4]+B[5])=(1+2+2+1)=6$ and $\Phi_2(D,S)=(4\lambda_2+3\mu_2+\omega_{22})+\lambda_1-\Pi=3.5$ s. Then, $\Delta_2=\Phi_2(D,S)/(\Sigma_{p \in S_2}B[p]+1)=3.5/7=0.5$ s, $\Delta_3=\omega_{33}/(B[3]+B[4])=14/3$ s, $\Delta_4=\omega_{43}/B[4]=28/2=14$ s, $\Delta_5=\omega_{52}/B[5]=20/1=20$ s, $\Delta=\min\{\Delta_2, \Delta_3, \Delta_4, \Delta_5\}=0.5$ s, and $\Theta=\Pi+\Delta=90.5$ s. Let $\Delta_{ij}=\omega_{ij}$, $i \in \mathbb{N}_3\setminus\{1\}$ and $j \in \Omega_{i(n[i])}$, where $\omega_{ij}$'s are obtained by the algorithm in [Yang, et al., 2015] with cycle time $\Theta=\Pi=90$ s as given above. Then, by Algorithm 2, the robot waiting time is set as follows. For $C_4$, $\omega_{40}=A_{40}+\Delta=11.5$ s, $\omega_{41}=A_{41}+\Delta=1.5$ s, $\omega_{42}=A_{42}+\Delta-2.5$ s, and $\omega_{43}=A_{43}-2\Delta-27$ s; for $C_3$, $\omega_{31}=A_{31}+2\Delta+\Delta=9.5$ s, $\omega_{30}=A_{30}+\Delta=3.5$ s, $\omega_{32}=A_{32}+\Delta=1.5$ s, and $\omega_{33}=A_{33}-2\Delta-2\Delta=12$ s; for $C_5$, $\omega_{50}=A_{50}+\Delta-15.5$ s, $\omega_{51}=A_{51}+\Delta=13.5$ s, and $\omega_{52}=A_{52}-\Delta=19.5$ s; for $C_2$, $\omega_{20}=A_{20}+4\Delta+\Delta=4.5$ s, $\omega_{21}=A_{21}+\Delta+\Delta=1$ s, and $\omega_{22}=A_{22}-4\Delta-\Delta-\Delta=19$ s; and for $C_1$, $\omega_{10}=\Theta-\psi_{11}=3.5$ s and $\omega_{11}=\omega_{12}=0$. In this way, an optimal one-wafer cyclic schedule is obtained and its Gantt chart is shown in FIG. 7.

E. The Present Invention

The present invention is developed based on the theoretical development in Sections A-C above.

An aspect of the present invention is to provide a computer-implemented method for scheduling a treelike hybrid K-cluster tool to generate a one-wafer cyclic schedule. The K-cluster tool has K single-cluster tools.

The method comprises given a value of cycle time, generating a part of the schedule for a section of the K-cluster tool by performing a generating algorithm. The section of the K-cluster tool is either an EST or a ST. The generating algorithm is based on Algorithm 1 above. In particular, the generating algorithm for $EST_k$ or $ST_k$, with $C_i$ being a downstream adjacent tool of $C_k$ and with $\Theta$ being the given value of cycle time for $EST_i$, $ST_i$ or $B_i$ comprises Step 3 of Algorithm 1 under a condition that the checking result of Step 1 is negative. Preferably, the generating algorithm further comprises Step 2 and Step 4 of Algorithm 1, provided that the checking result of Step 1 is negative.

The method is further elaborated based on Algorithm 2 as follows. First identify $ST_j$, with $j=\max_{l \in F}\{l\}$, and one or more ESTs of $ST_j$ in the K-cluster tool. The one or more ESTs are denoted as $EST_{j-1}$, $EST_{j-2}$ down to $EST_i$ such that an upstream adjacent tool of $C_i$ is a fork tool. A first part of the schedule for $ST_j$ is first determined by performing the generating algorithm. Then determine a second part of the schedule for $EST_{j-1}$ based on the first part of the schedule. Determining one part of the schedule $EST_{j-m}$ based on a determined part of the schedule for $EST_{j-m+1}$ is repeated until the one or more ESTs are scheduled.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In particular, the method disclosed herein can be implemented in a treelike hybrid K-cluster tool if the K-cluster tool includes one or more processors. The one or more processors are configured to execute a process of scheduling the K-cluster tool according to one of the embodiments of the disclosed method.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for scheduling a treelike hybrid K-cluster tool with a plurality of branches, sub-trees (ST) and extended sub-trees (EST) to generate a one-wafer cyclic schedule, the treelike hybrid K-cluster tool having K single-cluster tools denoted as $C_1, C_2, \ldots, C_K$, with $C_1$ being a head tool of the treelike hybrid K-cluster tool, the single-cluster tool $C_k$, $k \in \mathbb{N}_K$, having a robot $R_k$ for wafer handling, $\Theta$ being the cycle time for all the branches as iteratively calculated with a maximum fundamental period $\Pi$ being a given initial cycle time, where the one-wafer cyclic schedule of the treelike hybrid K-cluster tool cannot be found with the given initial cycle time, the method comprising:

determining fundamental periods (FP) $\Pi_1, \Pi_2, \ldots, \Pi_K$ for the single-cluster tools $C_1, C_2, \ldots, C_K$ and applying a maximum fundamental period $\Pi=\max\{\Pi_1, \Pi_2, \ldots, \Pi_K\}$ as the given initial cycle time $\Theta$;

determining a one-wafer cyclic schedule for each of the ST ($ST_i$) by increasing the cycle time $\Theta$ by $\Delta$, wherein the ST comprises one or more branches;

wherein the determining of one-wafer cyclic schedule for each of the ST comprises:
determining the k such that $C_k$ is an upstream adjacent tool of $C_j$;
determining a one-wafer cyclic schedule for each of the EST ($EST_j$) based on a generating algorithm by increasing the cycle time $\Theta$ by $\Delta$ if $C_k$ is not a fork tool, wherein the EST comprises one or more ST and the generating algorithm further comprises:
(S1.1) determining, responsive for finding that $k \notin F$ and $A_{i(n[i])} \neq 0$, a time increment $\Delta m$ according to:

$$\Delta_m = A_{m(n[m])}/\Sigma_{p \in S_m}B[p] \text{ if } m>i$$

and $$\Delta_m = \Delta_i = \begin{cases} \Phi_i(S,S) - A_{i(n[i])} & \text{for Condition 1,} \\ \dfrac{\Phi_i(S,S)}{1+\Sigma_{p \in S_i}B[p]} & \text{for Condition 2,} \\ \dfrac{\Phi_i(D,S)}{1+\Sigma_{p \in S_i}B[p]} & \text{for Condition 3,} \end{cases} \text{ if } m=i,$$

(S1.2) computing, responsive for finding that $\Delta=\min\{\Delta_p|p \in S_i\}=\Delta_i$,
(S1.2.1) in $EST_i$ or $B_i$, for $p \notin S_i$:
responsive for finding that $p \notin L$, $\omega_{p((b[p]\_1)-1)}=A_{p((b[p]\_1)-1)}+\Delta$;
responsive for finding that $p \in L$, $\omega_{p0}=A_{p0}+\Delta$;
(S1.2.2) in $EST_i$ or $B_i$, responsive for finding that $p \in S_i$ and $p \notin F$:
further responsive for finding that $p \in L$, $\omega_{pj}=A_{pj}+Y$ for $j \in D[p]$, or for $j \in \mathbb{N}_{n[p]}\setminus\{n[p]\}$;

further responsive for finding that p∈L, $\omega_{p((b[p]\_1)-1}=A_{p((b[p]\_1)-1}+\Sigma_{q\in S_p\setminus\{p\}}B[q]\times A_{i(n[i])}/(\Sigma_{p\in S_i}B[p])+\Delta$, or $\omega_{p0}=A_{p0}+\Delta$; and $\omega_{p(n[p])}=A_{p(n[p])}-\Sigma_{q\in S_p}B[q]\times Y$;

(S1.2.3) in $EST_i$, responsive for finding that p∈$S_i$ and p∈F:

$$\omega_{pj} = A_{pj} + Y, j \in D[p];$$

$$\omega_{p((b[p]\_1)-1)} = A_{p((b[p]\_1)-1)} + \sum_{q \in S_{p\_1}} B[q] \times Y + \Delta;$$

$$\omega_{p((b[p]\_d)-1)} = A_{p((b[p]\_d)-1)} + \left(\sum_{q \in S_{p\_d}} B[q] + 1\right) \times Y,$$

$d \in \{2, 3, \ldots, f[p]\}$; and $$\omega_{p(n[p])} = A_{p(n[p])} - \sum_{q \in S_p} B[q] \times Y;$$

(S1.3) responsive for finding that $\Delta=\min\{\Delta_p|p\in S_i\}=\Delta_j\neq\Delta_i$, performing the Steps (S1.2.1), (S1.2.2) and (S1.2.3) with Y=$\Delta_j$, followed by repeating the Steps (S1.1), (S1.2) and (S1.3);

and the generating algorithm is implemented by a wafer handling robot in a wafer processing device in a semiconductor manufacturing industry for determining the one-wafer cyclic schedule for each of the EST, an optimized schedule is obtained with an optimal cycle time Θ for the treelike hybrid K-cluster tool;

where:

Condition 1 is that $$0 < A_{i(n[i])} \leq \frac{\sum_{p \in S_i} B[p] \times \Phi_i(S, S)}{1 + \sum_{p \in S_i} B[p]}$$

and an S-S case is considered,

Condition 2 is that $$A_{(i+1)(n[i+1])} \geq \frac{\sum_{p \in S_i} B[p] \times \Phi_i(S, S)}{1 + \sum_{p \in S_i} B[p]}$$

and the S-S case is considered,

Condition 3 is that a D-S case is considered;

Y=$\Phi_i$(S,S)−$A_{i(n[i])}$ when the Condition 1 is satisfied;

$$Y = \frac{\Phi_i(S, S)}{1 + \sum_{p \in S_i} B[p]}$$

when the Condition 2 is satisfied;

$$Y = \frac{\Phi_i(D, S)}{1 + \sum_{p \in S_i} B[p]}$$

when the Condition 3 is satisfied;

L denotes an index set of leaf tools in the treelike hybrid K-cluster tool;

F denotes an index set of fork tools in the treelike hybrid K-cluster tool;

$ST_j$ denotes a ST with $C_j$ being a fork tool and a root node of the ST, and $EST_i$ is an EST of $ST_j$ with none of $C_i, C_{i+1}, \ldots, C_{j-2}, C_{j-1}$ being a fork tool;

$B_i$, starting from $C_i$ and ends at $C_m$, m∈L, denotes a linear multi-cluster tool in the treelike K-cluster tool;

$\omega_{ij}$ is a robot waiting time of $R_i$ at Step j as obtained after the cycle time is increased by Δ, j∈$\Omega_{n[i]}$, n[i] being an index of a last processing step of $C_i$;

$A_{kj}$ is a robot waiting time at Step j for $R_k$ as determined for the cycle time Θ;

$S_i$ is a set of single-cluster tools connected to $C_i$ and selected from the K single-cluster tools;

B[k]=n[k]−1;

b[p]_d is an index denoting a d-th outgoing module of $C_p$;

D[p] be a set of processing steps in $C_p$;

f[i], 1≤f[i]≤n[i], denotes the number of outgoing modules in $C_i$, i∉L;

$\Phi_{i+1}(S,S)=4\lambda_{i+1}+3\mu_{i+1}+A_{(i+1)(n[i+1])}-\Theta+4\lambda_i+3\mu_i$ when $C_i$ and $C_{i+1}$ are S-S, and $\Phi_{i+1}(D, S)=4\lambda_{i+1}+3\mu_{i+1}+A_{(i+1)(n[i+1])}-\Theta+\lambda_i$, when $C_i$ and $C_{i+1}$ are D-S;

$\lambda_i$ is a time taken by $R_i$ to load or unload a wafer in $C_i$;

$\mu_i$ is a time taken by $R_i$ to move between process modules of $C_i$ for transiting from one processing step to another;

$\mathbb{N}_L=\{1, 2, \ldots, L\}$ for a positive integer L; and $\Omega_L = \mathbb{N}_L \cup \{0\}$.

2. The method of claim 1, wherein the generating algorithm further comprises the steps of:

(S2) responsive for finding the optimal cycle time for $EST_k$ or $ST_k$, k∉F and $A_{i(n[i])}$=0, where the one-wafer cyclic schedule cannot be found with the given initial cycle time, performing:

updating Θ with a value computed by Θ+$\Delta_i$=Θ+$\Phi_i$(S, S) for S-S case, or Θ+$\Delta_i$=Θ+$\Phi_i$(D, S) for D-S case; and based on the updated value of Θ, recomputing the robot waiting times for the robots in $EST_k$ or $ST_k$, so that the part of the schedule for $EST_k$ or $ST_k$ is generated and thereby the performing of the generating algorithm is completed;

(S3) responsive for finding the optimal cycle time for $EST_k$ or $ST_k$, and k∈F, where the one-wafer cyclic schedule cannot be found with the given initial cycle time, performing Steps (S3.1), (S3.2) and (S3.3);

(S3.1) finding the optimal cycle time Θ+$\Delta_q$ for $C_k$ with $EST_{k\_q}$ or $ST_{k\_q}$, q∈$\mathbb{N}_{f[k]}$, by performing the Steps (S.1) and (S.2);

(S3.2) updating Θ with a value computed by Θ+max{$\Delta_1$, $\Delta_2$, ..., $\Delta_{f[k]}$}; and (S3.3) finding the part of the schedule for $ST_k$ by recomputing the robot waiting times with the updated cycle time Θ;

where:

$EST_{k\_q}$ or $ST_{k\_q}$ is the EST or the ST having the single-cluster tool $C_i$ and a branch thereof, $B_{i\_q}$.

3. The method of claim 2, further comprising:

identifying, in the treelike hybrid K-cluster tool, $ST_j$ with j=$\max_{l \in F}\{l\}$, and one or more ESTs of $ST_j$, the one or more ESTs being denoted as $EST_{j-1}$, $EST_{j-2}$ down to $EST_i$ such that an upstream adjacent tool of $C_i$ is a fork tool;

determining a first part of the schedule for $ST_j$ by performing the generating algorithm;

determining a second part of the schedule for $EST_{j-1}$ based on the first part of the schedule; and repeating determining one part of the schedule $EST_{j-m}$ based on a determined part of the schedule for $EST_{j-m+1}$ until the one or more ESTs are scheduled.

4. The method of claim 2, wherein $R_k$ is single-arm or double-arm.

5. The method of claim 1, further comprising:

identifying, in the treelike hybrid K-cluster tool, $ST_j$ with $j=\max_{l \in F}\{l\}$, and one or more ESTs of $ST_j$, the one or more ESTs being denoted as $EST_{j-1}$, $EST_{j-2}$ down to $EST_i$ such that an upstream adjacent tool of $C_i$ is a fork tool;

determining a first part of the schedule for $ST_j$ by performing the generating algorithm;

determining a second part of the schedule for $EST_{j-1}$ based on the first part of the schedule;

repeating determining one part of the schedule $EST_{j-m}$ based on a determined part of the schedule for $EST_{j-m+1}$ until the one or more ESTs are scheduled.

6. The method of claim 1, wherein $R_k$ is single-arm or double-arm.

7. The method of claim 1, wherein the one-wafer cyclic schedule cannot achieve a lower bound of cycle time.

* * * * *